United States Patent
Wagoner et al.

(10) Patent No.: US 8,050,063 B2
(45) Date of Patent: Nov. 1, 2011

(54) SYSTEMS AND METHODS FOR CONTROLLING A CONVERTER FOR POWERING A LOAD

(75) Inventors: Robert Gregory Wagoner, Roanoke, VA (US); Allen Ritter, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 720 days.

(21) Appl. No.: 12/185,534

(22) Filed: Aug. 4, 2008

(65) Prior Publication Data

US 2008/0304302 A1    Dec. 11, 2008

Related U.S. Application Data

(63) Continuation-in-part of application No. 11/809,122, filed on May 31, 2007, now Pat. No. 7,847,507.

(51) Int. Cl.
*H02H 7/122* (2006.01)

(52) U.S. Cl. ............... 363/56.02; 363/132; 318/800

(58) Field of Classification Search ............ 363/39, 363/56.02, 56.03, 56.04, 56.05, 131, 132; 318/599, 800
See application file for complete search history.

(56) References Cited

U.S. PATENT DOCUMENTS

| | | | |
|---|---|---|---|
| 6,803,741 B2 * | 10/2004 | Messersmith | 318/729 |
| 7,034,501 B1 | 4/2006 | Thunes et al. | |
| 7,643,318 B2 * | 1/2010 | Wagoner | 363/56.02 |
| 7,643,319 B2 * | 1/2010 | Wagoner | 363/65 |
| 7,847,507 B2 * | 12/2010 | Wagoner | 318/599 |

FOREIGN PATENT DOCUMENTS

| | | |
|---|---|---|
| JP | 5003605 A | 6/1991 |
| JP | 2008048537 A | 8/2006 |

OTHER PUBLICATIONS

Search Report for International Application No. GB0913242.4 filed on Sep. 2, 2009 (Nov. 25, 2009).
U.S. Appl. No. 12/111,398, filed Apr. 29, 2008, Ritter.

* cited by examiner

*Primary Examiner* — Adolf Berhane
*Assistant Examiner* — Emily Pham
(74) *Attorney, Agent, or Firm* — Sutherland Asbill & Brennan LLP

(57) ABSTRACT

Systems and methods for controlling a converter for powering a load are provided. According to one embodiment of the invention, a method for powering a load is provided. A power converter may be provided. At least one gating control signal having a switching pattern may be supplied to the power converter, wherein the switching pattern has a waveform with an effective switching frequency greater than 1 times the fundamental frequency of the switching pattern and less than 2 times the fundamental frequency of the switching pattern. At least one output power signal may be output to the load responsive at least in part to the at least one gating control signal supplied.

20 Claims, 16 Drawing Sheets

SYSTEMS AND METHODS FOR CONTROLLING A CONVERTER FOR POWERING A LOAD

CROSS-REFERENCE TO RELATED APPLICATIONS

This application is a continuation-in-part of U.S. application Ser. No. 11/809,122 filed on May 31, 2007, which is incorporated herein by reference in its entirety.

TECHNICAL FIELD

The invention relates generally to power converters, and more particularly relates to systems and methods for controlling a converter for powering a load.

BACKGROUND OF THE INVENTION

High-speed, high-power electric motors that operate at variable speed are increasingly utilized in a range of industrial, mining and drilling activities. Further, the activities often depend upon a high-degree of reliability. In operations such as crude oil pumping from remote global locations where access to pumping stations is difficult and time-consuming, reliability of motor operation may prevent dangerous, costly and extended outages. Simple, sturdy and reliable power converters are preferred for such high-speed, high-power motor operations. It is well known that providing multiple individual components, such as series or parallel semiconductor switches, may increase the likelihood that any one individual component switch may randomly fail. Added elements such as snubber circuits for semiconductor switches, further increases the number of components that can fail. It is desirable to arrange the power converter in a simple configuration, with as low a part component count as is possible. However, individual components, such as the semiconductor switches for the power converter, can be operated with satisfactory margin to thermal and other functional limits to avoid failures in the simplified configuration.

A power converter used in one example embodiment may be a simplified three-phase, wye-connected H-bridge converter configuration, such as is illustrated in FIG. 1. Each phase of the converter includes a power source/sink 20 with a dc power shaping circuit, represented by capacitor 30. The power source/sink/20 and dc power shaping circuit, represented by capacitor 30, establish a dc-link voltage input to the semiconductor switches of the bridge. Insulated-gate bipolar transistors (IGBTs) 40 with built-in diodes 45 may form each leg of the H-bridges 50, for example, but other power semiconductor switches such as integrated-gate commutated thyristors (IGCTs) or metal-oxide semiconductor field-effect transistors (MOSFETs) could be used instead. The type of power semiconductor switch is not important to the analysis. Each H-bridge includes two legs, an output leg 60 and a neutral leg 65. Each phase output, phase A 70, phase B 75 and phase C 80 is connected to the midpoint 85 of the respective output bridge leg 60. Each neutral connection to wye-point 90 is tied to the midpoint 95 of the respective neutral output leg 65.

Gating controls 35 provide control signals 36, 37, 38 for switching semiconductor switches 40 of Phases A, B, and C of the H-bridge converter, according to predetermined switching patterns. Gating controls may provide for synchronous switching or asynchronous (pulse-width modulation, for example) switching of the semiconductors switches 40 of the H-bridge.

However, to improve availability of operation of the motor loads, it is desirable to further balance temperatures, reduce switching and power losses and harmonic distortion. Reduction in switching loss will keep semiconductor H-bridge switches operating at lower temperatures with a greater margin to failure.

Accordingly, there exists a need for systems and methods for controlling a converter for powering a load in order to balance temperatures, and to reduce switching loss and total harmonic distortion.

BRIEF DESCRIPTION OF THE INVENTION

According to one embodiment of the invention, there is disclosed a method for powering a load. A power converter may be provided. At least one gating control signal having a switching pattern may be supplied to the power converter, wherein the switching pattern has a waveform with an effective switching frequency greater than 1 times the fundamental frequency of the switching pattern and less than 2 times the fundamental frequency of the switching pattern. At least one output power signal may be output to the load responsive at least in part to the at least one gating control signal supplied.

According to another embodiment of the invention, there is disclosed a system for powering a load. The system may include a voltage source, a converter, and at least one gating controller. The voltage source may be operable to supply a power signal. The at least one gating controller may be operable to supply at least one gating control signal having a switching pattern to the power converter, wherein the switching pattern has a waveform with an effective switching frequency greater than 1 times the fundamental frequency of the switching pattern and less than 2 times the fundamental frequency of the switching pattern. The converter may be operable to receive the power signal from the voltage source and output at least one output power signal to the load responsive at least in part to the at least one gating control signal supplied.

According to another embodiment of the invention, there is disclosed a method for powering a load. A three-phase wye-connected H-bridge power converter may be provided, wherein each phase of the H-bridge power converter may include two legs. An input power signal may be supplied to the H-bridge power converter. A different gating control signal having a switching pattern may be supplied to each leg of each phase of the H-bridge power converter, wherein each switching pattern has a waveform including at least a first notch positioned to occur at a substantially positive slope of a reference voltage of the respective gating control signal and a second notch positioned to occur at a substantially negative slope of the reference voltage. The waveform may have an effective switching frequency greater than 1 times the fundamental frequency of the switching pattern and less than 2 times the fundamental frequency of the switching pattern, wherein the degrees of separation between each notch determines the effective switching frequency. At least one output power signal may be output to the load responsive at least in part to the gating control signals supplied.

Other embodiments, aspects, and features of the invention will become apparent to those skilled in the art from the detailed description, the accompanying drawings and the appended claims.

BRIEF DESCRIPTION OF THE DRAWING

Figure 1:
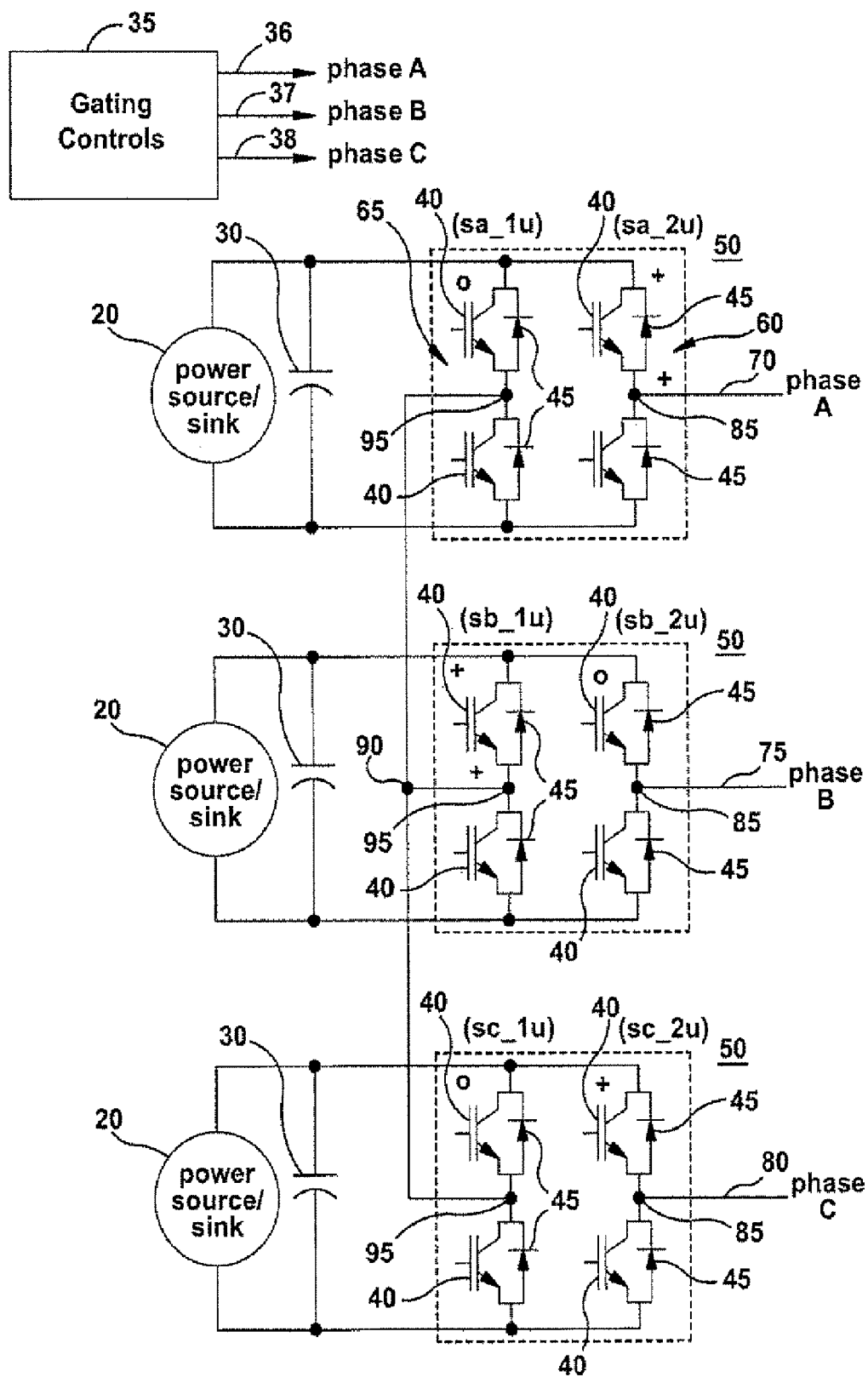
Figure 2A:
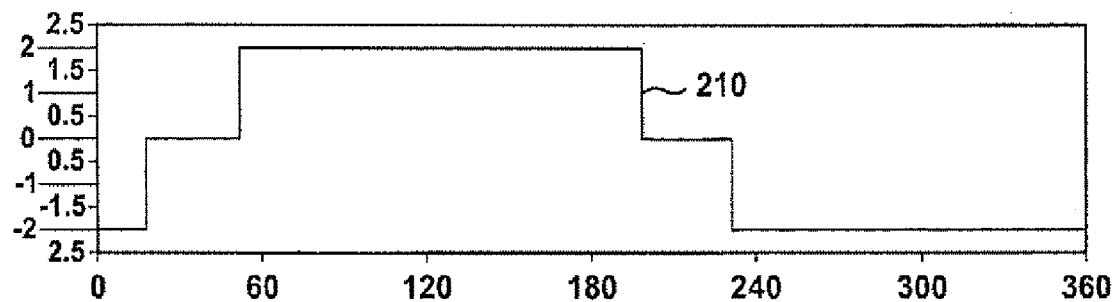
Figure 2B:
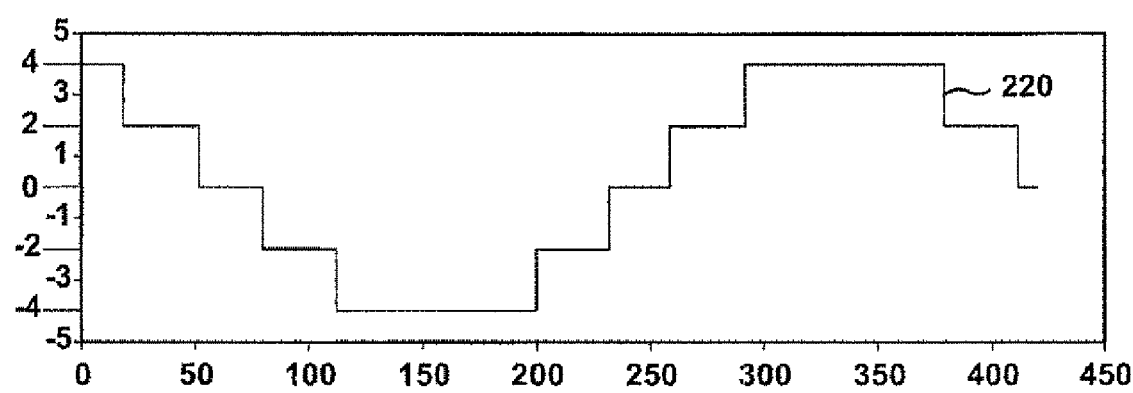
Figure 3:
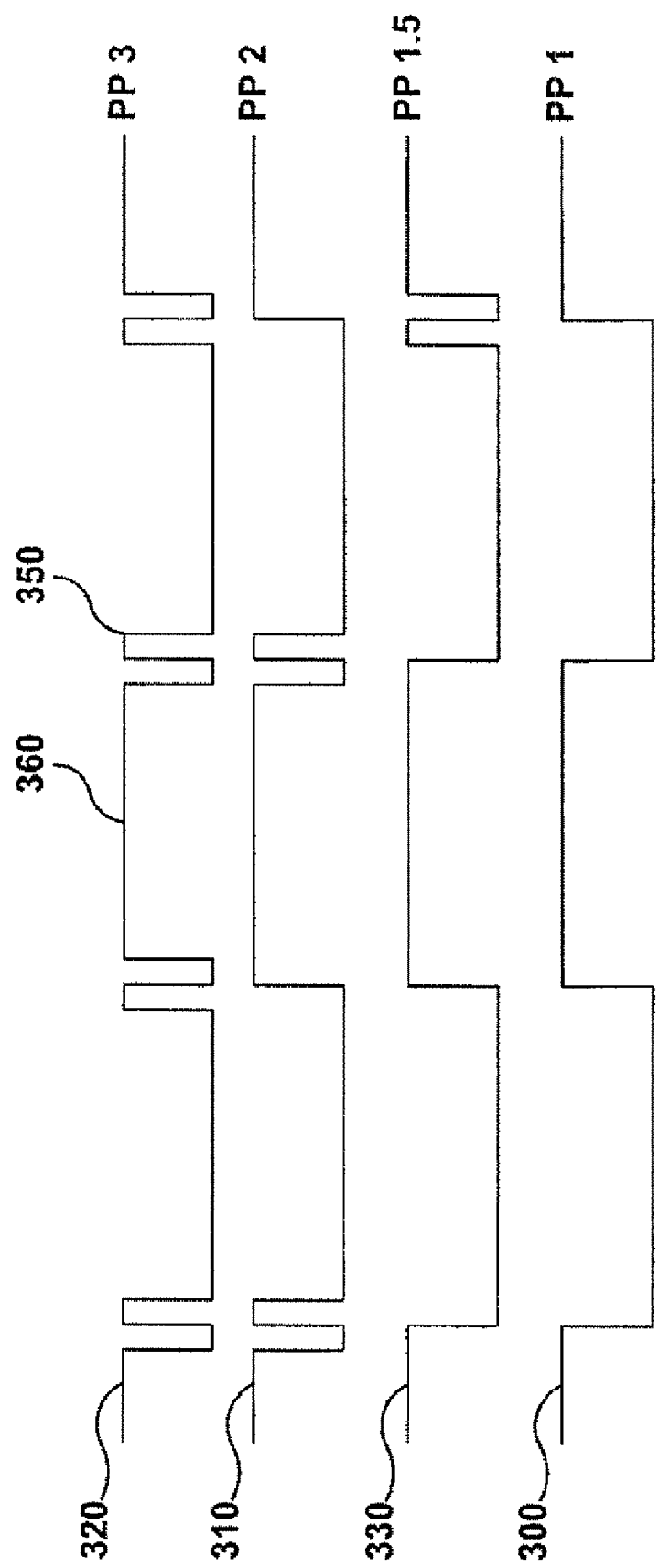
Figure 4A:
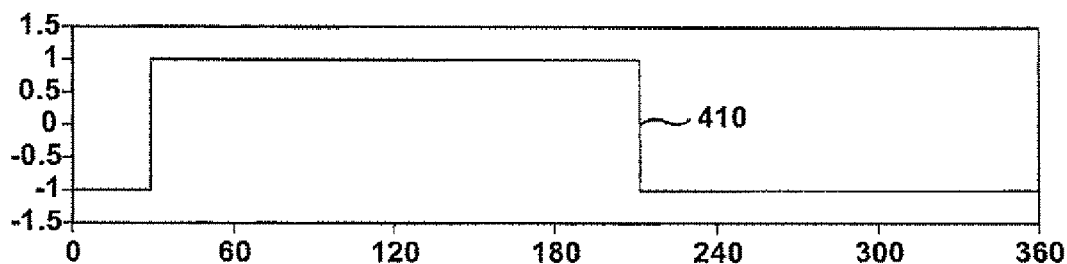
Figure 4B:
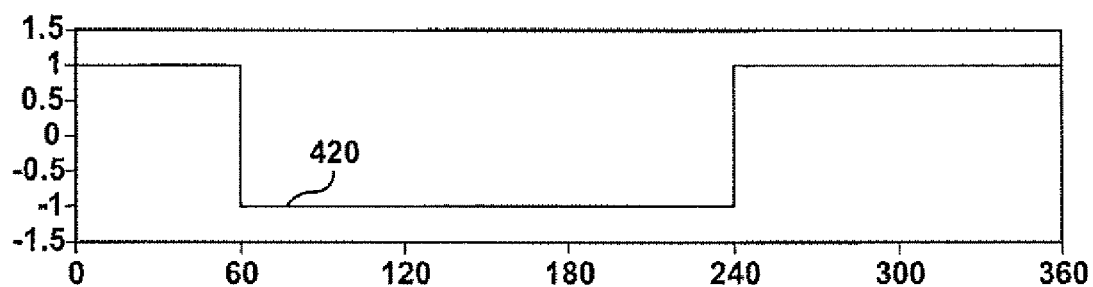
Figure 4C:
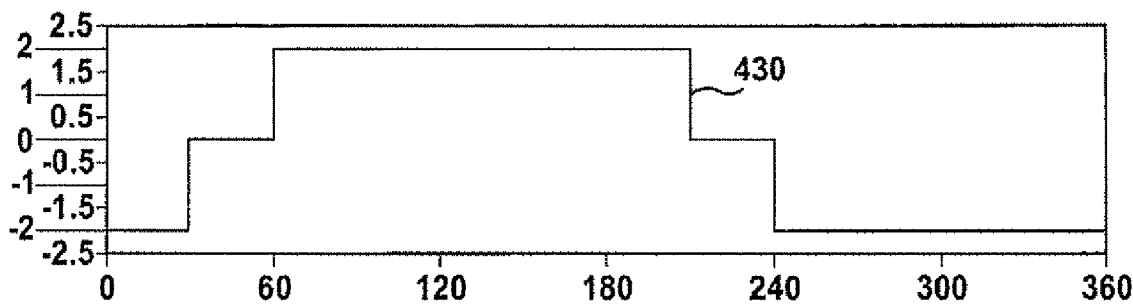
Figure 4D:
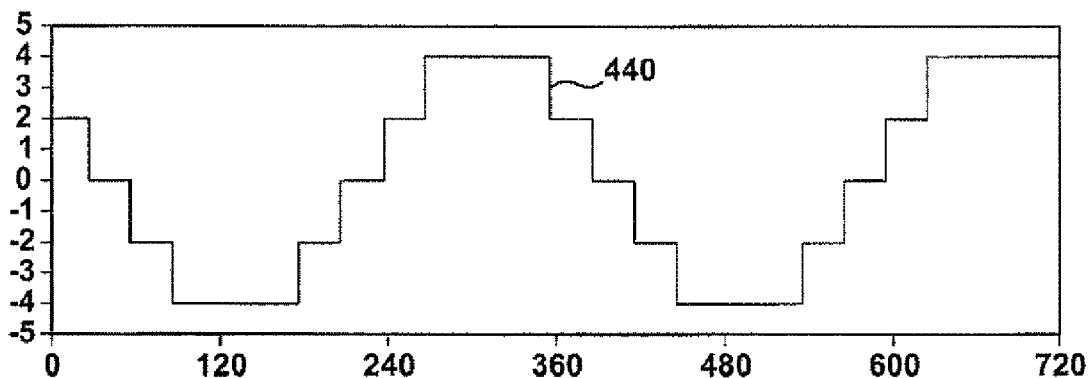

Having thus described the invention in general terms, reference will now be made to the accompanying drawings, which are not necessarily drawn to scale, and wherein:

FIG. 1 illustrates a simplified three-phase, wye-connected H-bridge converter configuration, according to an embodiment of the invention;

FIG. 2A illustrates stepped output voltage of a single H-bridge between leg midpoints, according to an embodiment of the invention;

FIG. 2B illustrates stepped output line-to-line voltage of two series f-bridges;

FIG. 3 illustrates four fixed pulse patterns (PP) with the same fundamental frequency for semiconductor device gating, according to an embodiment of the invention;

FIG. 4A (5A, 6A, 7A) illustrates a waveform for one phase of a single phase H-bridge with a PP1 (PP2, PP3, PP1.5) input waveform, according to an embodiment of the invention;

FIG. 4B (5B, 6B, 7B) illustrates a waveform for a second phase of a single phase H-bridge with a PP1 (PP2, PP3, PP1.5) input waveform, according to an embodiment of the invention;

FIG. 4C (5C, 6C, 7C) illustrates a waveform for a third phase of a single phase H-bridge with a PP1 (PP2, PP3, PP1.5) input waveform, according to an embodiment of the invention;

FIG. 4D (5D, 6D, 7D) illustrates an output waveform (line-to-line) for a second phase of a single phase H-bridge with a PP1 (PP2, PP3, PP1.5) input waveform, according to an embodiment of the invention.

Figure 8:
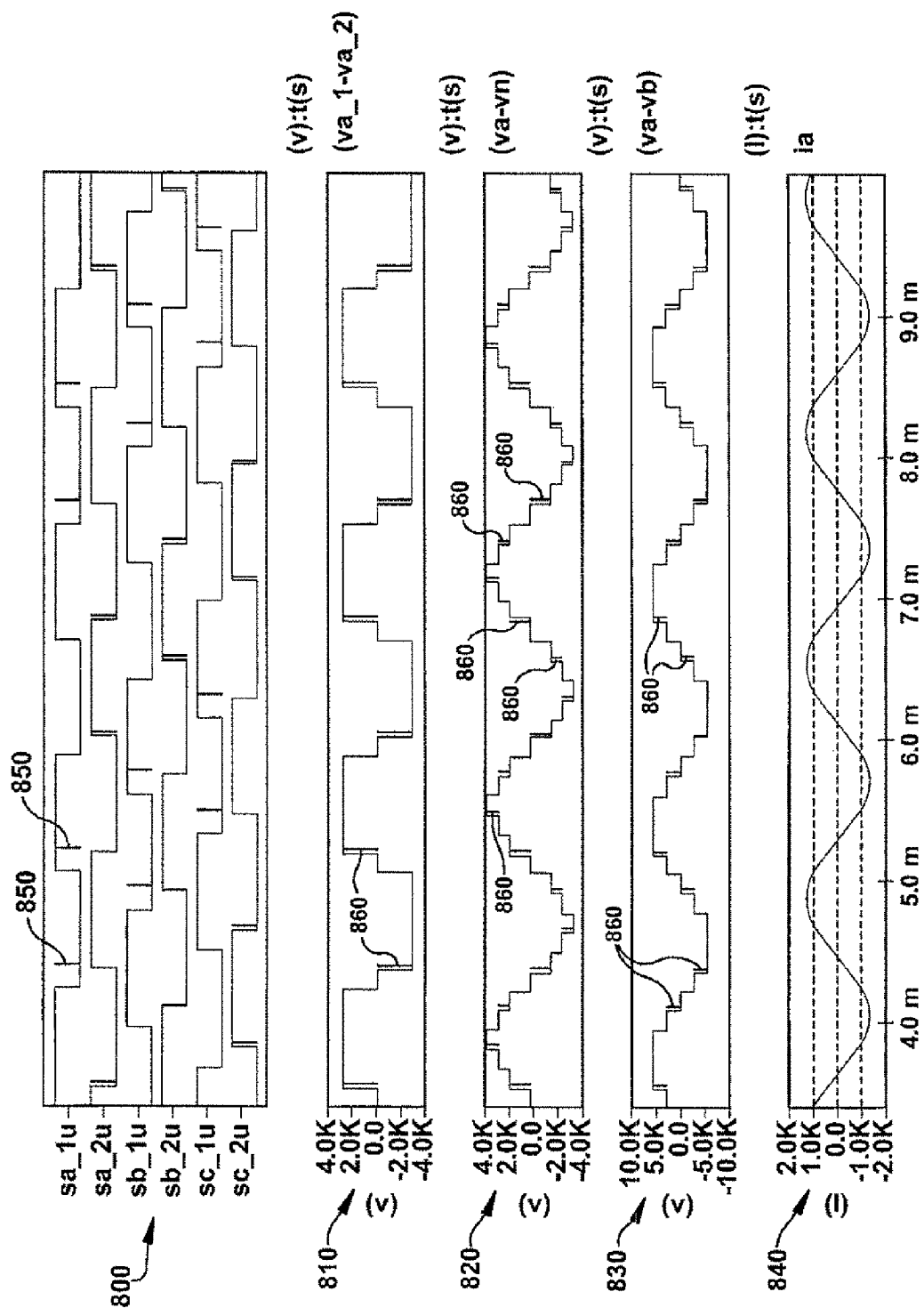
Figure 9A:
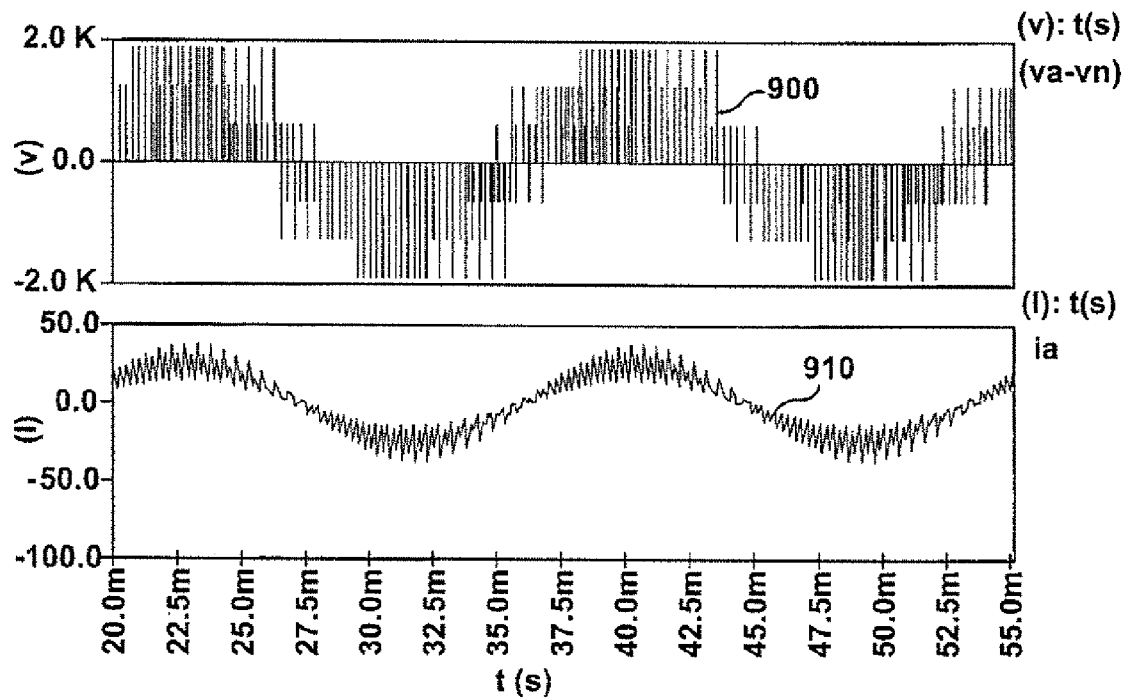
Figure 9B:
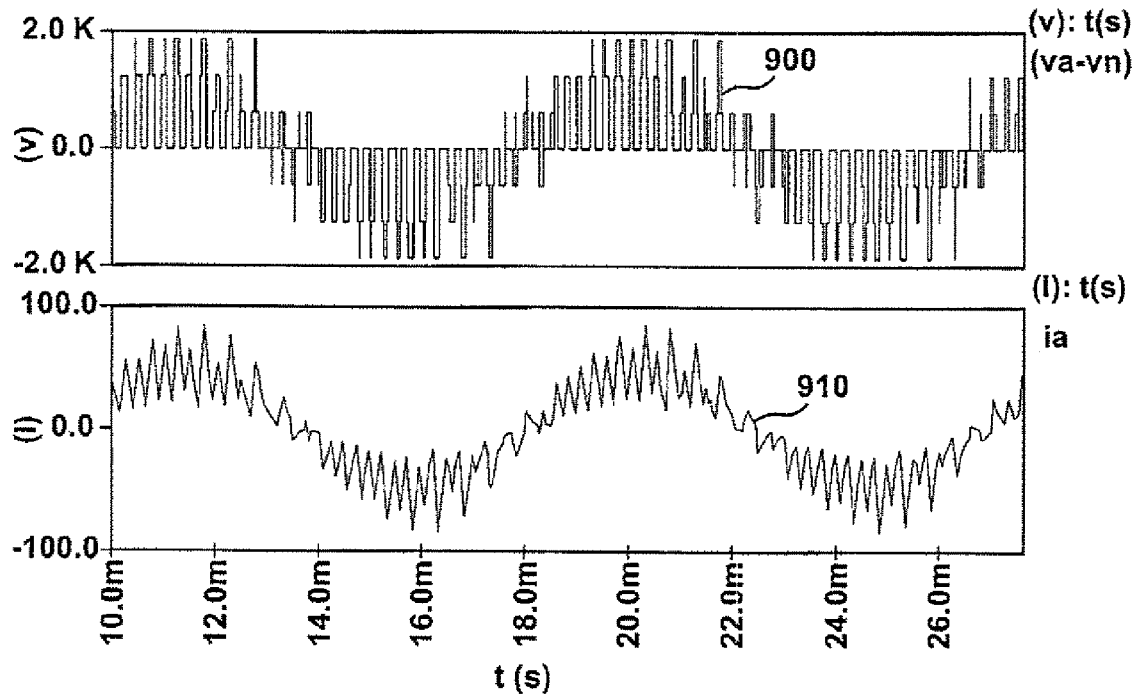
Figure 9C:
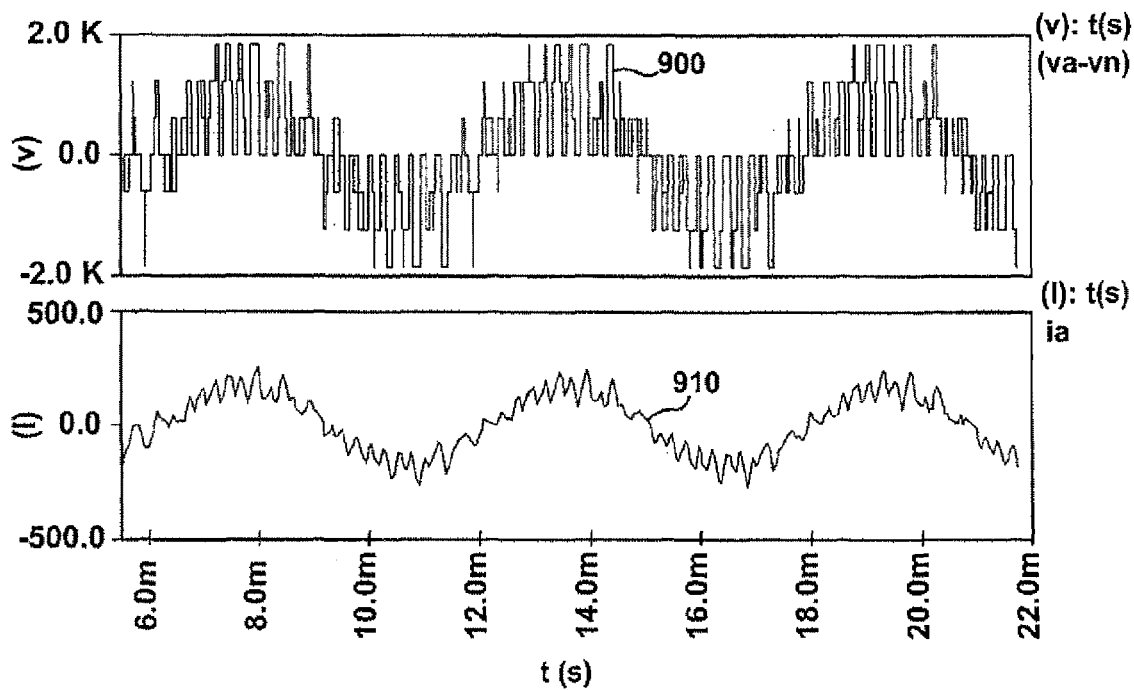
Figure 9D:
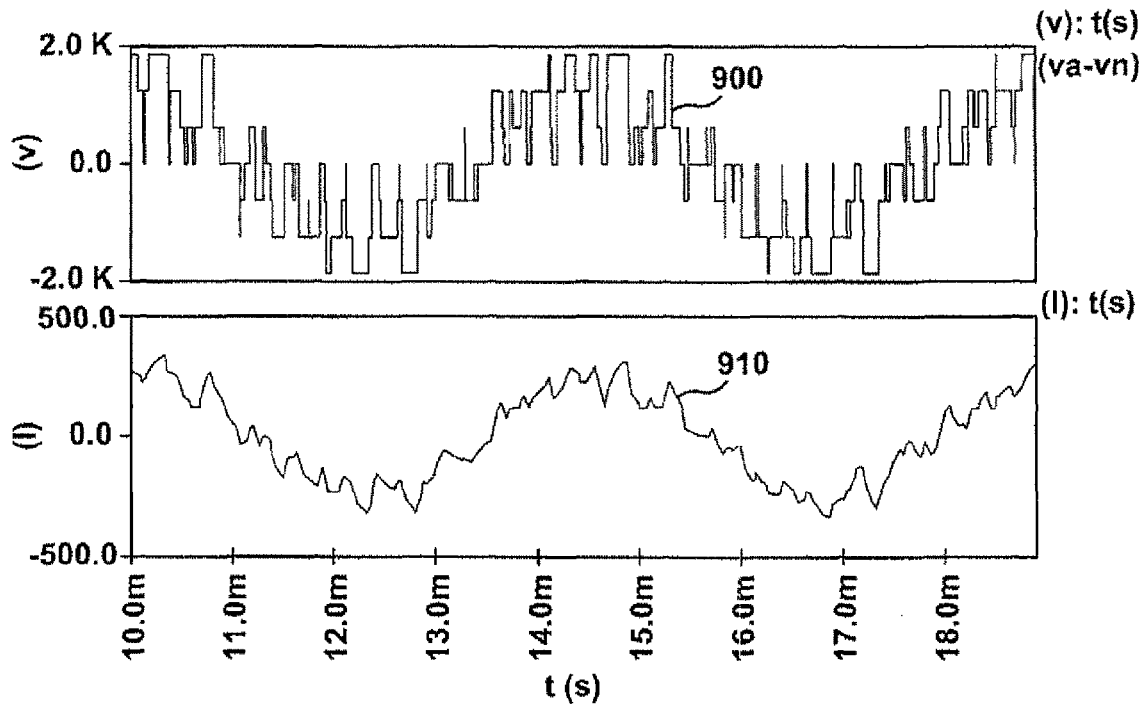
Figure 9E:
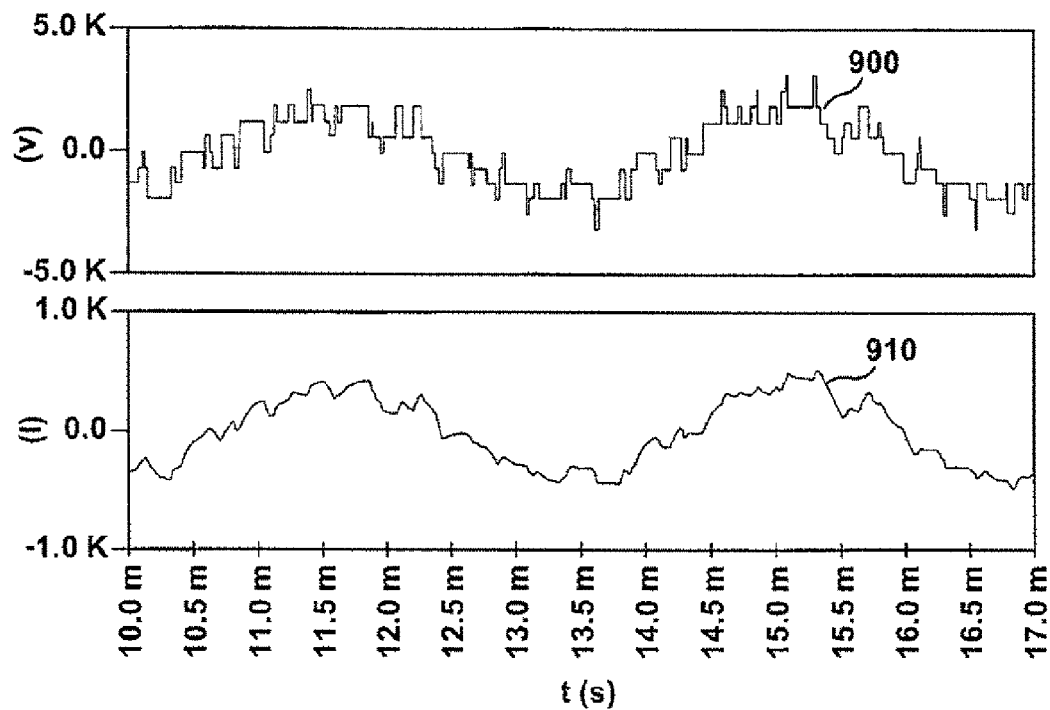
Figure 9F:
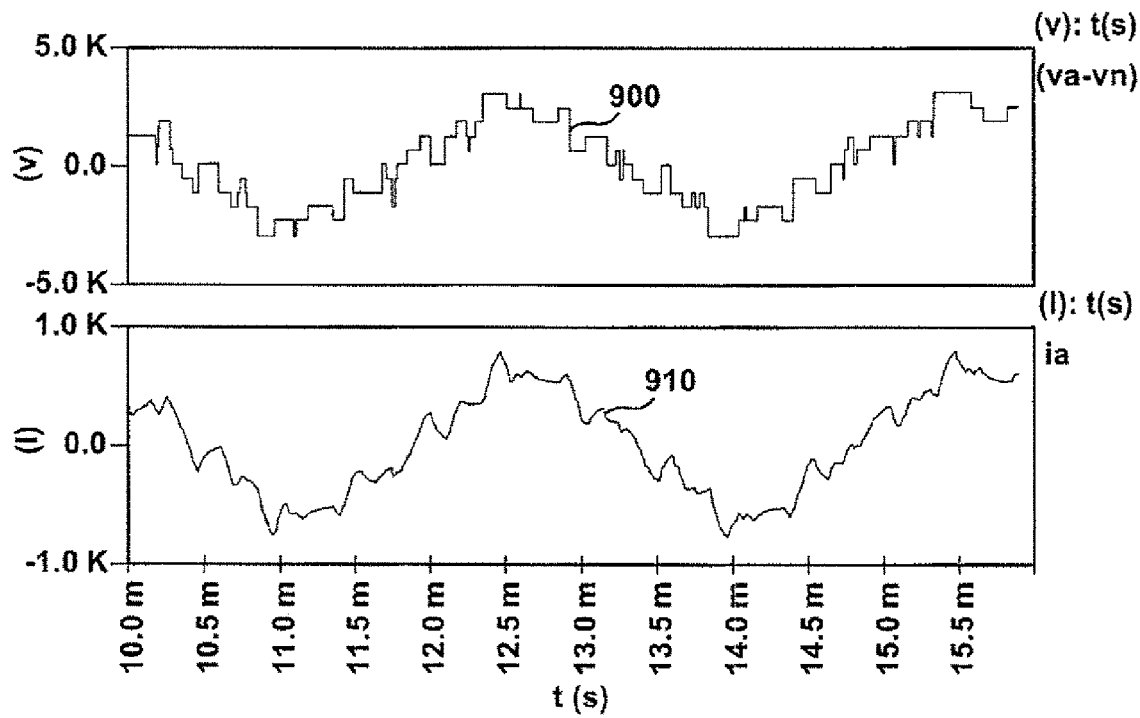
Figure 9G:
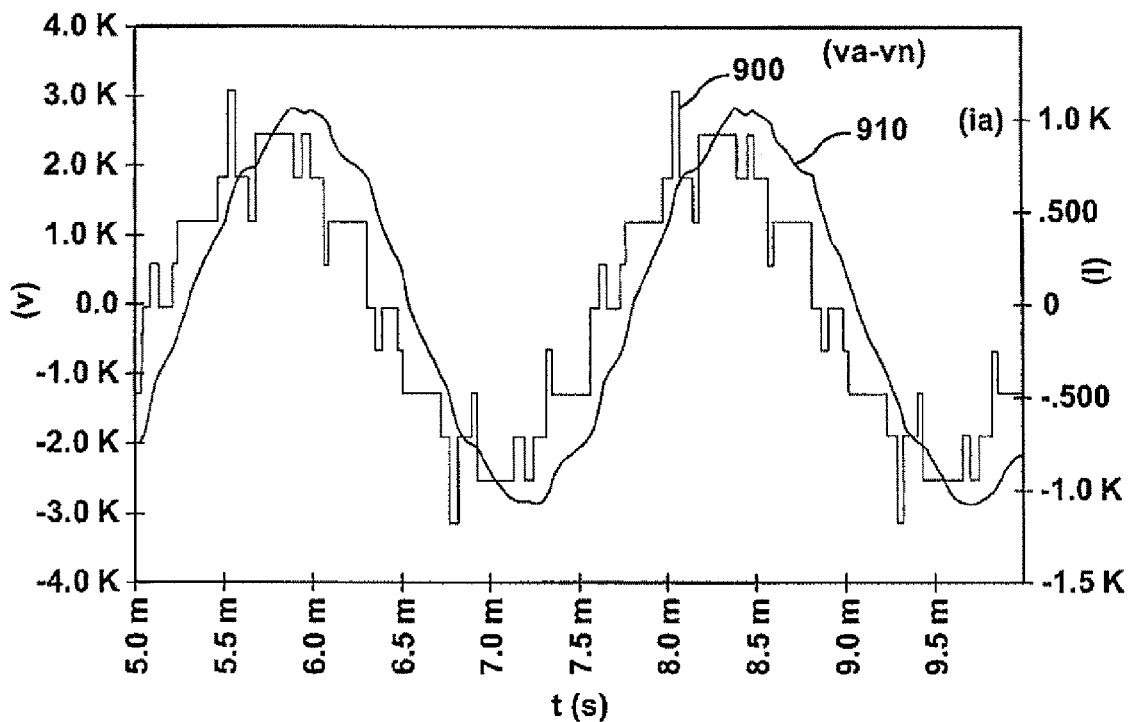
Figure 9H:
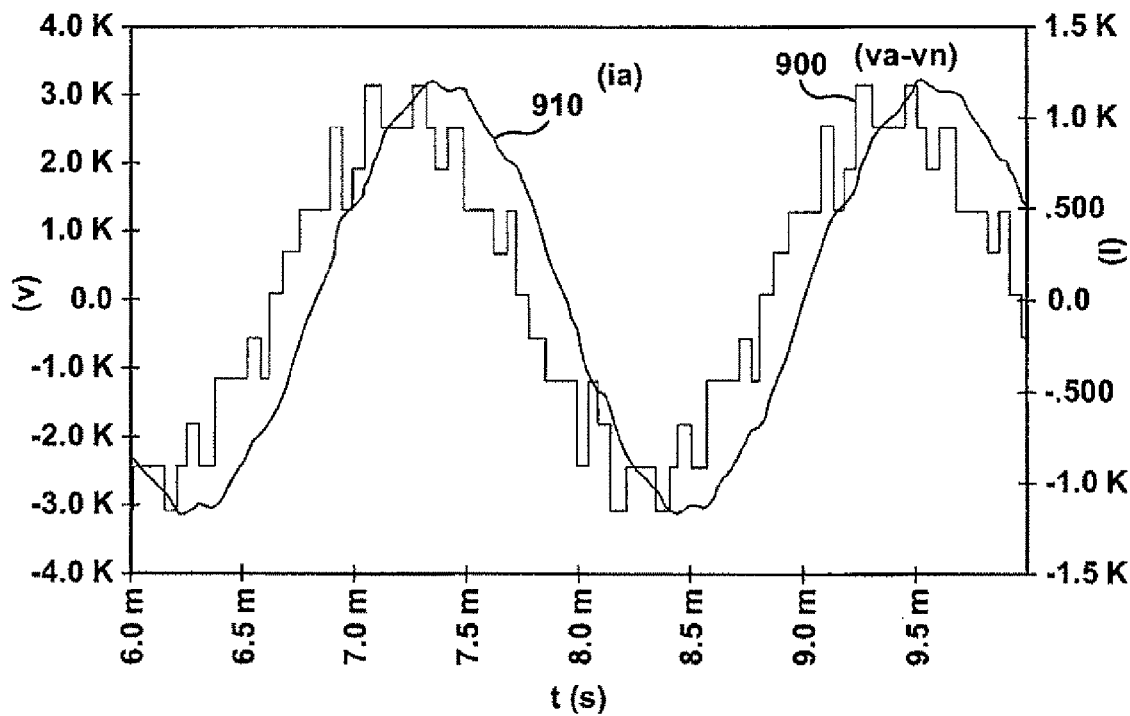
Figure 9I:
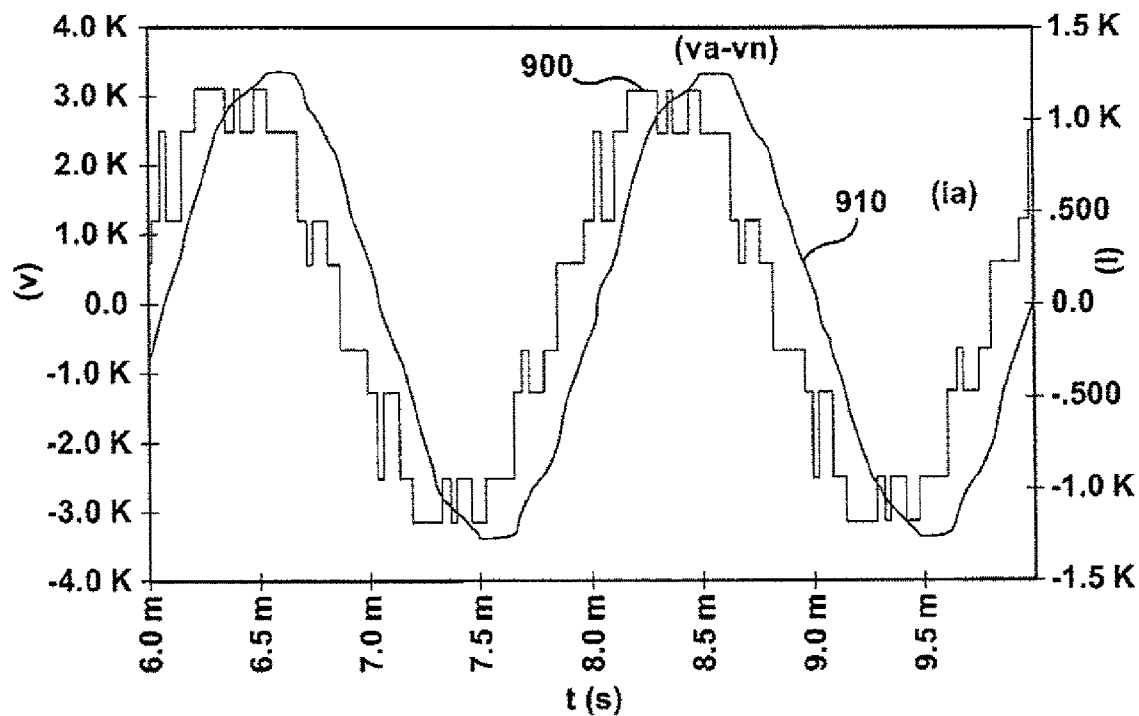
Figure 9J:
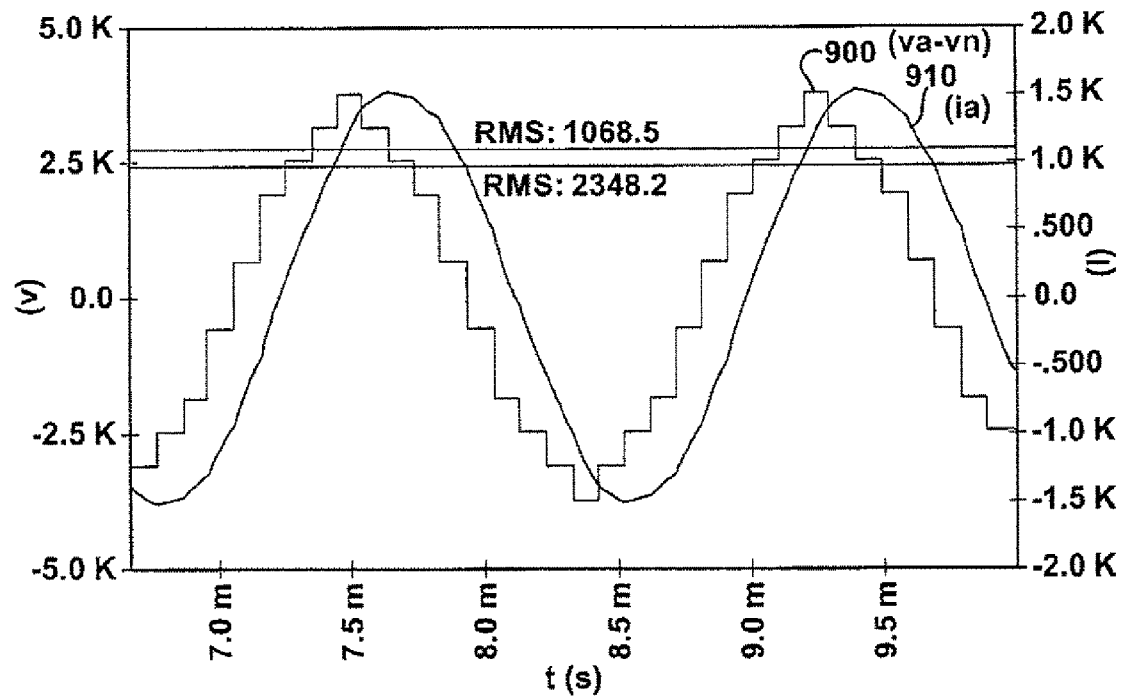
Figure 10:
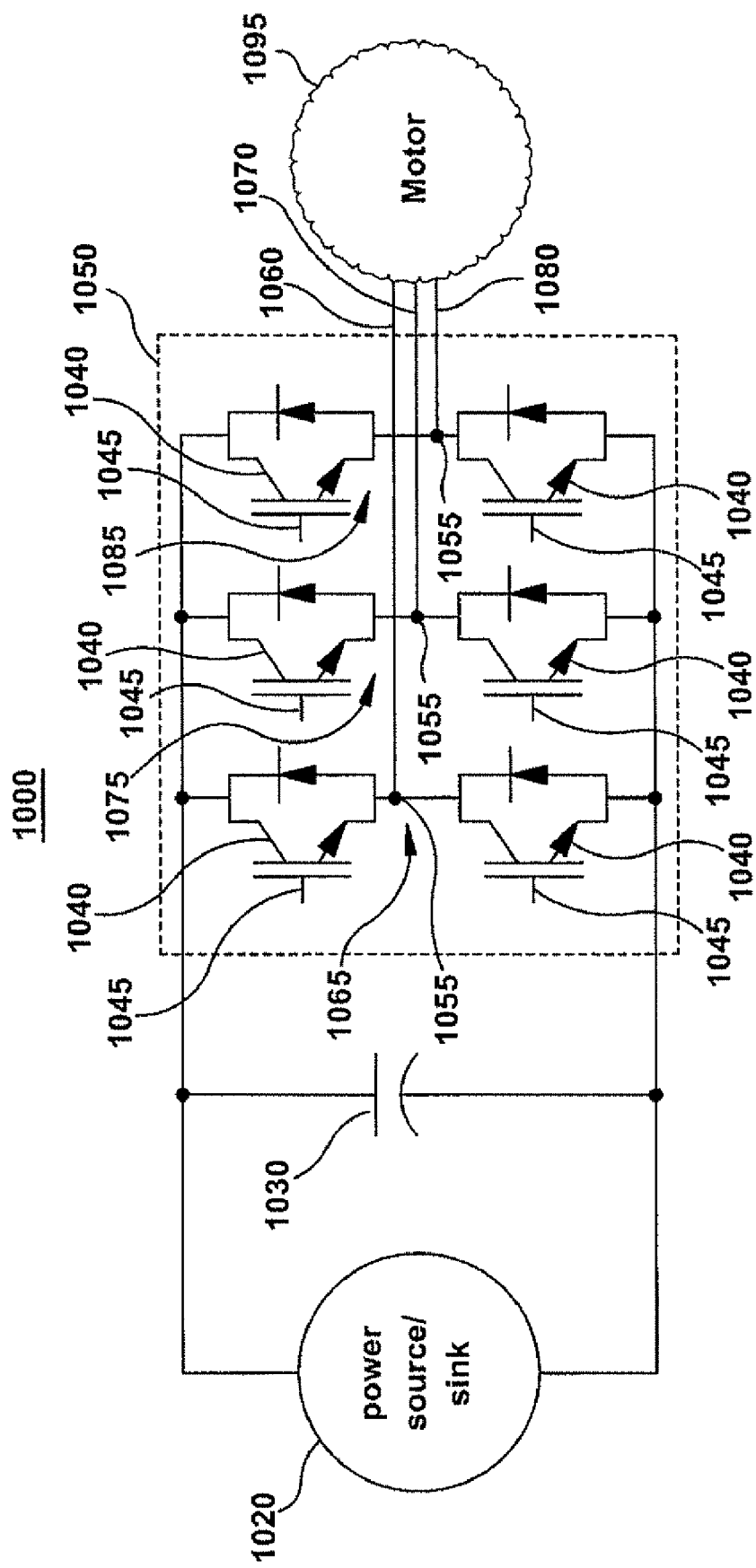
Figure 11:
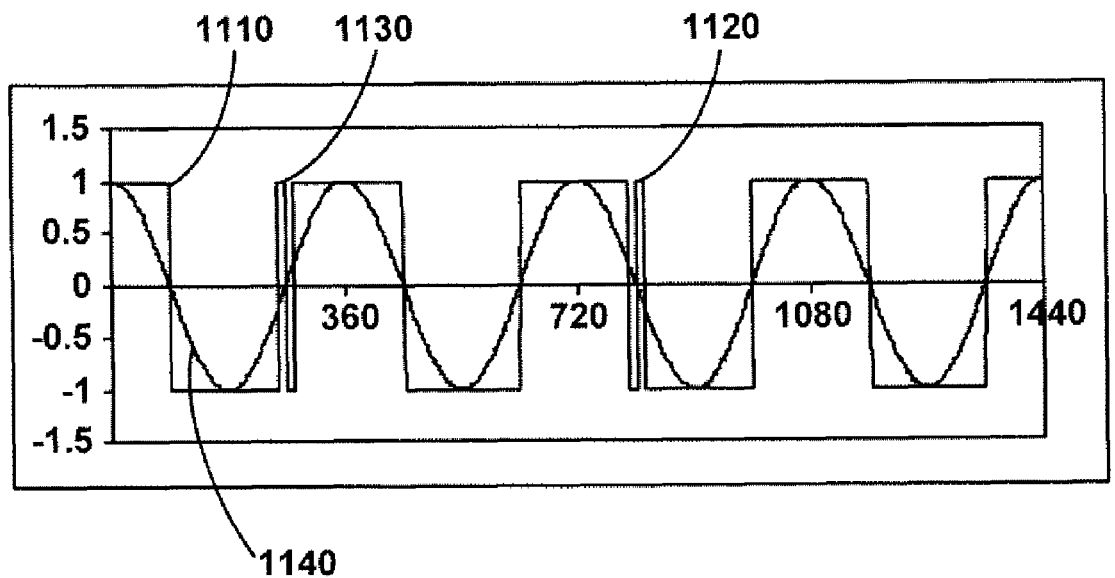
Figure 12:
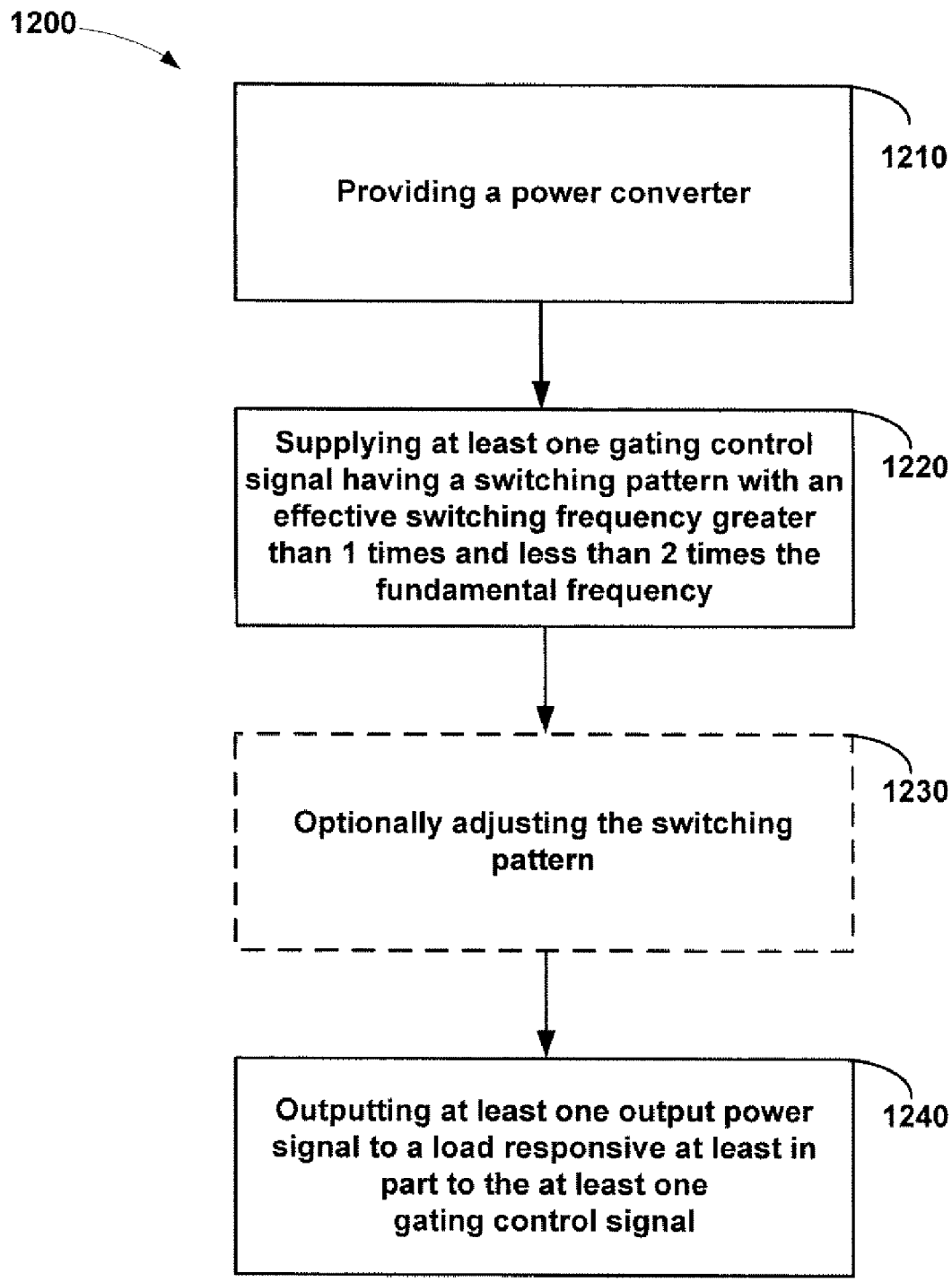

FIG. 8 provides a graph illustrating input and output waveforms for a three-phase, wye-connected H-bridge employing an inventive optimized ZCNotch2 switching waveform, according to an embodiment of the invention;

FIGS. 9A-9J illustrate the line voltage to neutral voltage and the line current for a phase of three-phase, wye-connected H-bridge converter under the inventive control strategies for powering an exemplary 6 MW high-speed motor over the full range of motor speed operation, according to an embodiment of the invention;

FIG. 10 illustrates a three-leg, three-phase converter bridge for driving a three-phase motor load according to an embodiment of the invention;

FIG. 11 illustrates an exemplary control signal that may be supplied to the power converter, according to an embodiment of the invention; and FIG. 12 illustrates a flowchart of an exemplary of a method for providing a signal to a load, according to an embodiment of the invention.

DETAILED DESCRIPTION OF THE INVENTION

Illustrative embodiments of the inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The following embodiments of the invention have many advantages, including providing adjusted switching waveforms and/or zero-current notch switching waveforms for large high-speed ac motors that provide current and voltage harmonics that are lower than prior art switching waveforms, while at the same time minimizing switching loss, thereby maximizing bridge output power capability.

The power factor of the motor determines the relationship between the converter output voltage and the load current. The notch position can be optimized to minimize switching loss by adjusting its position based on the particular power factor of the specific motor.

While the exemplary embodiments of the invention describe an application to a 6 MW, high-speed electric motor that may operate at about 17,000 RPM, the invention is not limited to high-speed ac motors, but includes application to all ac motors.

Several fundamental synchronous switching schemes for the three-phase wye-connected H-bridge converter may be considered with respect to the operation of large motors. The switching schemes establish a fundamental voltage output frequency for driving the motor. The switching output 210 of one phase of the H-bridge (between the midpoints of the respective legs) may establish a positive step output, a negative step output and a zero-value output, known as a three-level output, as shown in FIG. 2A. However in the three-phase wye-connected configuration, the output line voltage 220 (for example phase A to phase B) will provide a five-level output due to the combination of steps from the H-bridge of phase A and the H-bridge of phase B, as illustrated in FIG. 2B. Higher number of levels of output voltage will more closely simulate a sinusoidal wave and reduce harmonic distortion to the motor.

Four fixed pulse patterns with the same fundamental frequency are illustrated in FIG. 3. The fixed pulse patterns applied to the semiconductor switches of the individual H-bridges are 120 electrical degrees apart, resulting in the line output between phases (Phase A to Phase B for example) being 120 electrical degrees apart. Notches may be inserted around fundamental frequency pulses 360 of the pulse patterns to improve harmonic distortion performance. Insertion of notches 350 adds to the effective switching frequency of the bridge output. Pulse pattern 1 (PP1) 300 has an effective switching frequency of 1 times the fundamental frequency. Pulse pattern 2 (PP2) 310 has an effective switching frequency of 2 times the fundamental frequency. Pulse pattern 3 (PP3) 320 has an effective switching frequency of 3 times the fundamental frequency. Pulse pattern 1.5 (PP1) 340, with a notch applied in every other cycle, has an effective switching frequency of 1.5 times the fundamental frequency.

Higher switching rates due to the insertion of notches may incur higher switching losses on the semiconductor switches, putting the semiconductor switch closer to thermal margins and potentially impacting reliability of operation. PP1 has the lowest effective switching frequency and hence incurs the lowest switching loss in the semiconductor switches. However, PP1.5 presents the lowest harmonic distortion and at the same time, less switching loss than PP2 and PP3.

Figure 5A:
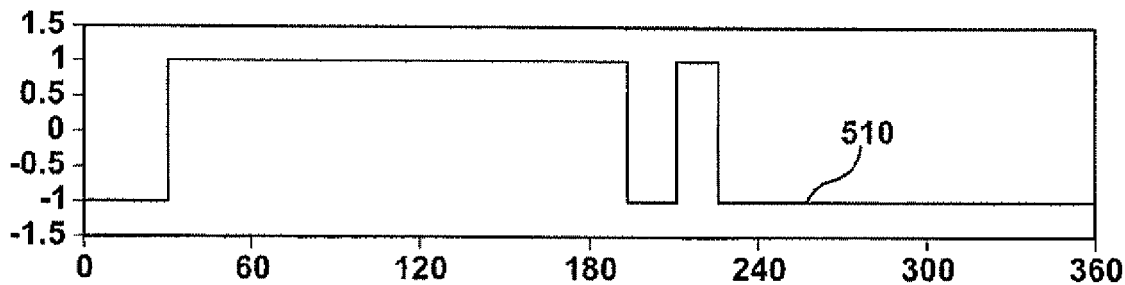
Figure 5B:
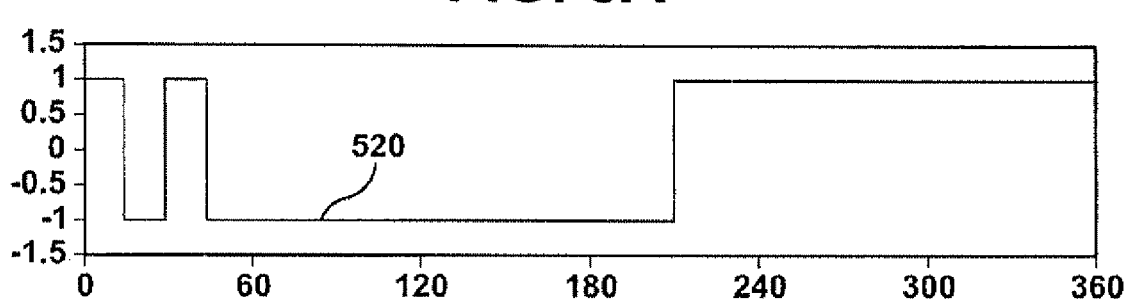
Figure 5C:
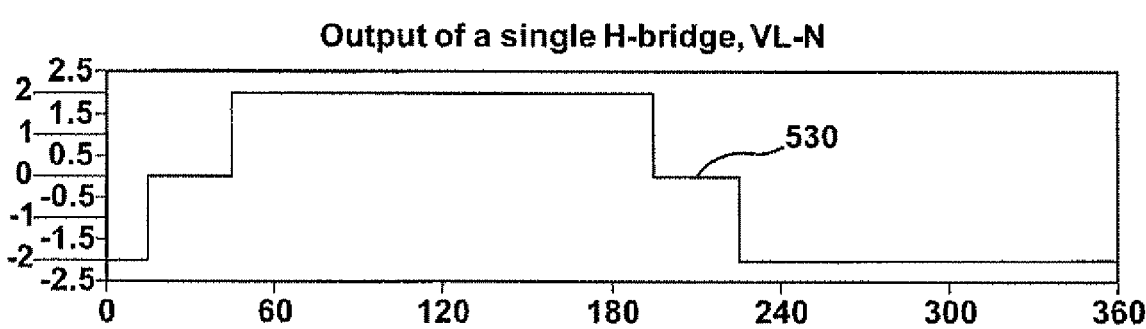
Figure 5D:
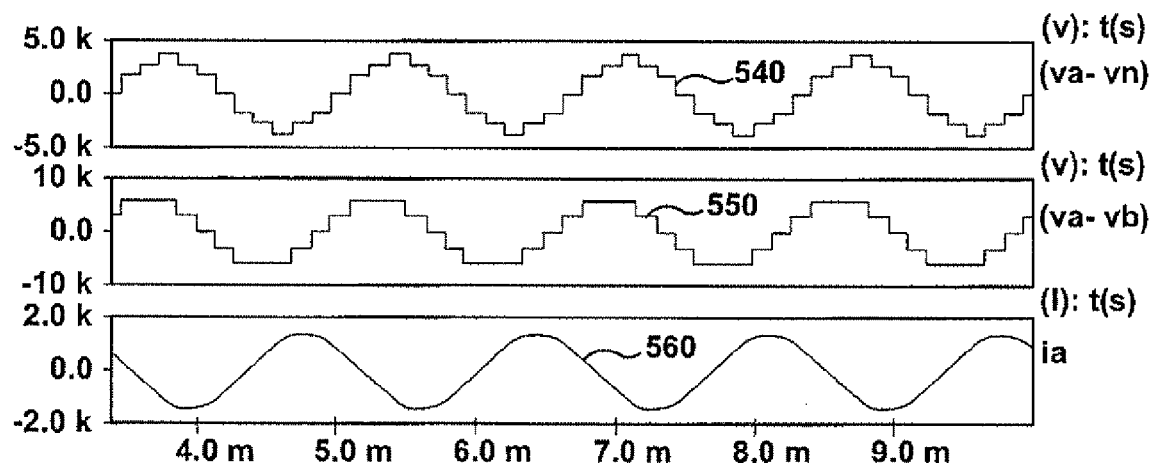
Figure 6A:
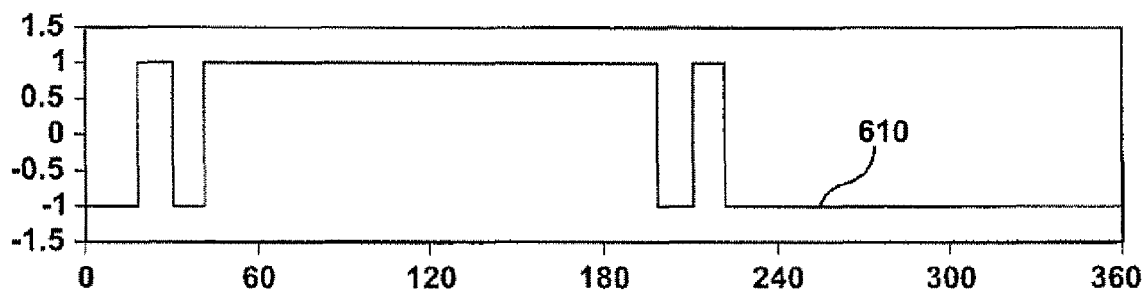
Figure 6B:
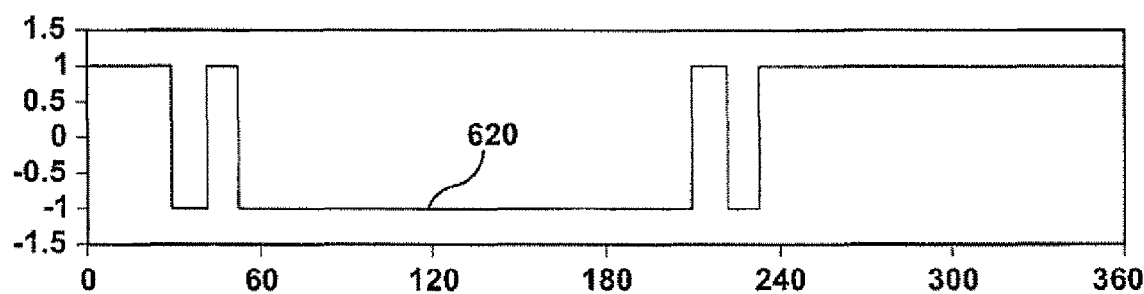
Figure 6C:
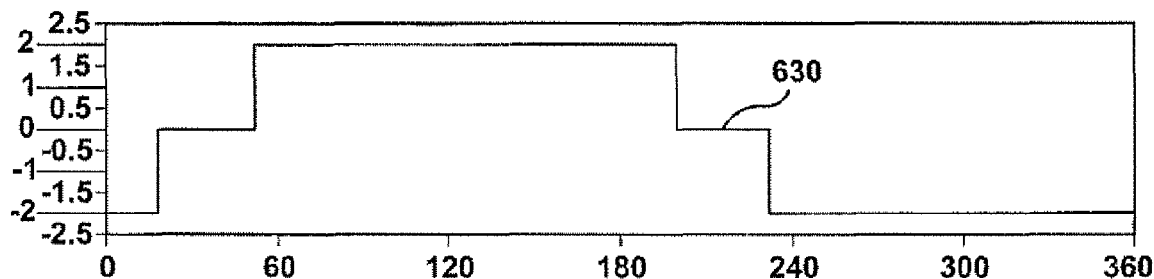
Figure 6D:
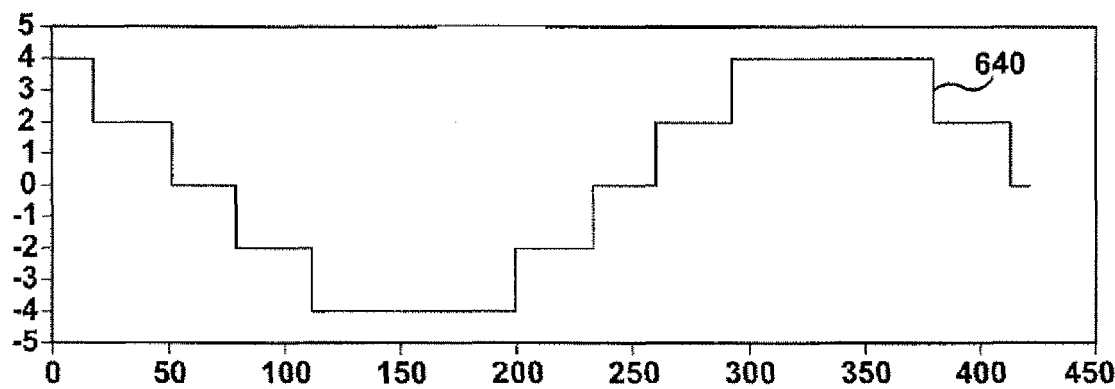
Figure 7A:
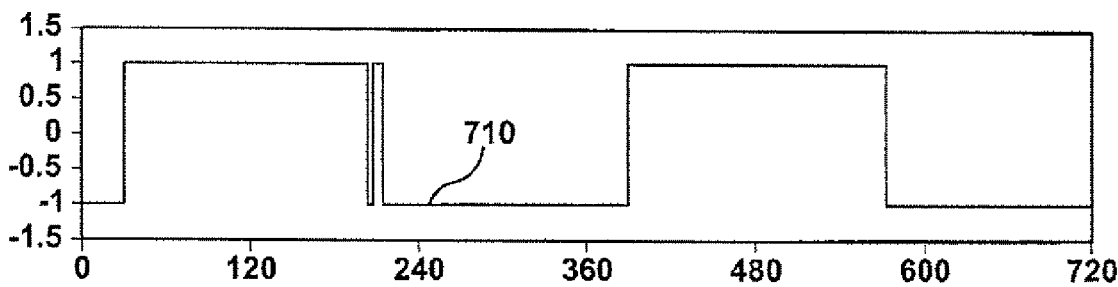
Figure 7B:
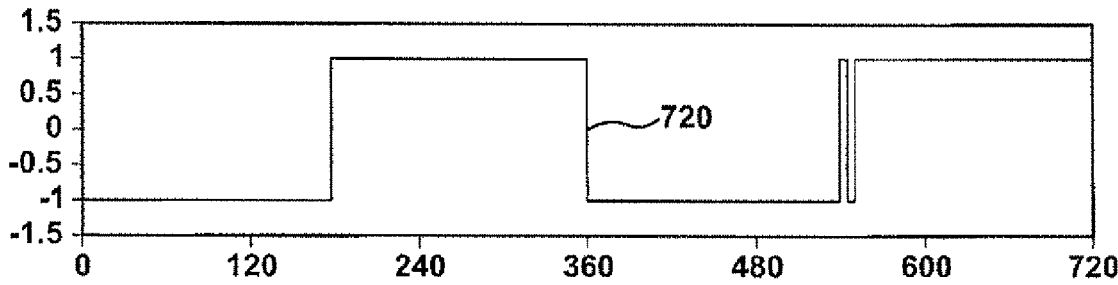
Figure 7C:
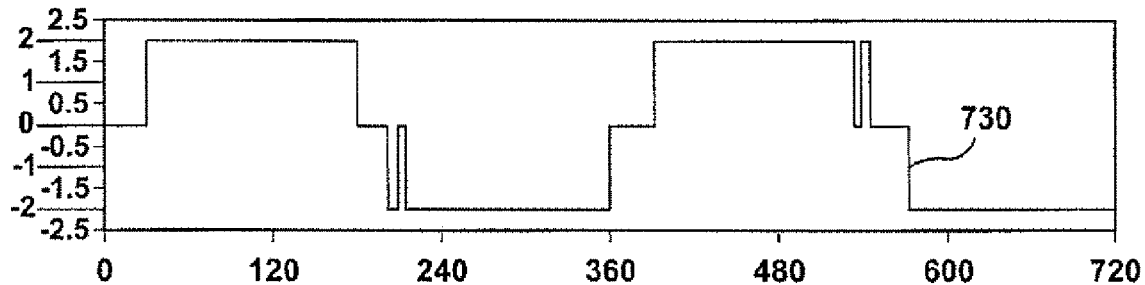
Figure 7D:
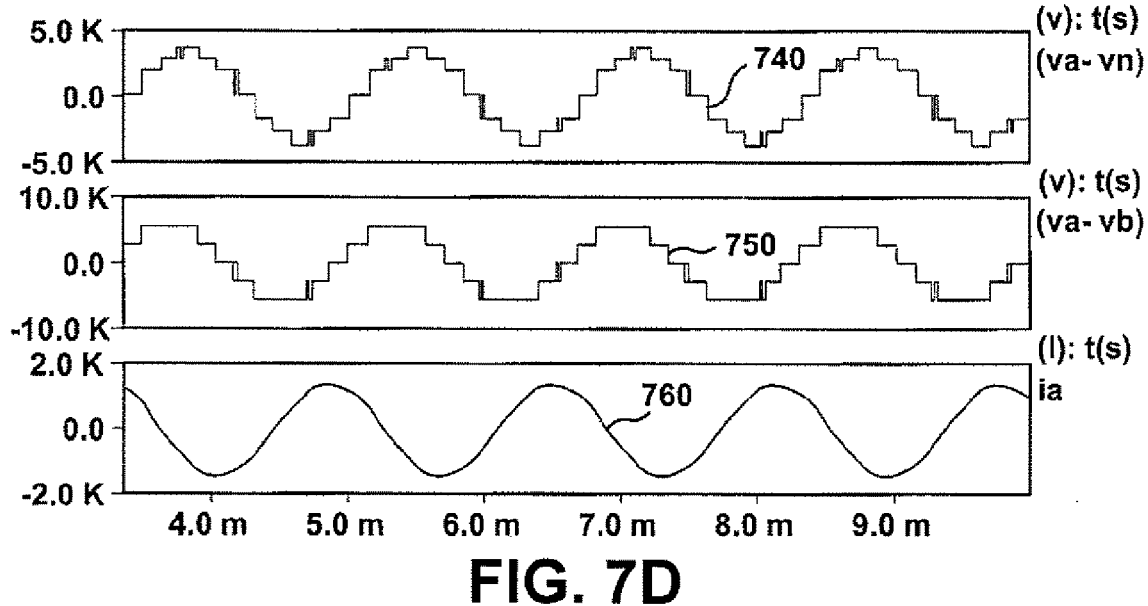

Further studies were conducted for PP1, PP2, PP3 and PP1.5 for evaluation of the effect of phase shift between the two legs of the bridges, notch width and notch location. With zero phase shift between control waveforms for legs of each individual H-bridge, some of the control waveforms to different H-bridges may not be unique resulting in some of the switching events in connected H-bridges occurring simultaneously, thereby not generating extra pulses on the output. In the aforementioned converter utilizing PP2 control waveforms, the control signals will be unique, but some of the switching events happen simultaneously and in the same direction in the same H-bridge. Switching loss occurs in both of the legs of the H-bridge simultaneously and in the same direction, without benefit of a switching event being seen in the output waveform. It is, therefore, desirable to introduce phase shift on the control signals between the two legs of the individual H-bridge to allow the switching edges to create voltage changes on the output waveform. Shifting phase between legs of the bridge may shift the timing of output step changes and preserve higher-level output, thereby more closely simulating sinusoidal output performance and limiting distortion. FIG. 4A (5A, 6A, 7A) illustrates a waveform 410 (510, 610, 710) for one phase of a single-phase H-bridge with a PP1 (PP2, PP3, PP1.5) input waveform. FIG. 4B (5B, 6B, 7B) illustrates a waveform 420 (520, 620, 720) for a second phase of a single-phase H-bridge with a PP1 (PP2, PP3, PP1.5) input waveform. FIG. 4C (5C, 6C, 7C) illustrates an output voltage waveform 430 (530, 630, 730) of a single H-bridge with a PP1 (PP2, PP3, PP1.5) input waveform. FIG. 4D (5D, 6D, 7D) illustrates a voltage output waveform 440 (540, 640, 740) (line-to-line) for a single phase H-bridge with a PP1 (PP2, PP3, PP1.5) input waveform. FIG. 5D (7D) illustrates simulation results for converter output voltage (line-to-line) 550 (750) and phase A line current 560 (760).

Combinations of phase shift in the control signal, notch width selection and notch placement were modeled for the PP1, PP2, PP3 and PP1.5 control signals to determine optimum combinations for minimizing total harmonic distortion (THD). The PP1 input waveform incorporates a 30-degree phase shift between the bridges with no notch. The PP2 input waveform incorporates a 15-degree notch with no phase shift between bridges. The PP3 input waveform incorporates 10-degree notch with a 10-degree phase shift between bridges. The PP1.5 input waveform incorporates a 7-degree notch with a 30-degree phase shift between bridges. TABLE 1 summarizes the total harmonic distortion (THD) on load current for the input waveforms PP1, PP2, PP3, and PP1.5. A minimum THD on load current is provided by the PP1.5 control waveform.

TABLE 1

| Pulse Pattern | Switching Frequency | Min. THD (load current) |
|---|---|---|
| PP1 | Fundamental x 1 | 2.62% |
| PP2 | Fundamental x 2 | 2.62% |
| PP3 | Fundamental x 3 | 2.62% |
| PP1.5 | Fundamental x 1.5 | 2.49% |

Analysis was also performed to identify the effect of notch positioning on H-bridge output current capability. The repetitive nature of this fixed pulse pattern leads to a steady state power loss and temperature rise that is significantly different between the upper and lower semiconductors in the same leg of the H-bridge. At one extreme, the upper IGCTs have more switching loss than the lower IGCTs, and the lower diodes have more reverse recovery loss than the upper diodes. By moving the position of the notch, the switching losses may be reversed from the upper to the lower devices, however the significant differences remain between the upper and lower semiconductors in the same leg of the H-bridge. Alternate positioning of the notch within the same pulse pattern may maintain the same effective frequency, but may balance the temperatures more equally for the upper and lower semiconductors in the same leg of the individual H-bridge.

TABLE 2 illustrates the results on IGCT and diode power loss and temperature under cases of maximum stress of the upper IGCT/diode, maximum stress on the lower IGCT/diode and balance between the upper IGCT/diode and the lower IGCT/diode due to notch positioning with a PP1.5 waveform applied to a 6 Mw motor with a motor frequency of 600 Hz, a 0.8 lagging power factor, and a motor current of 815 A RMS, where the IGCT is an ABB 5 SHX 26L4510 with built in diode. Since there is an imbalance in semiconductor temperatures between the upper and lower device in a particular leg of the H-bridge, the power semiconductor with the highest temperature limits the current rating of the bridge. The modified PP1.5 pulse pattern maintains the same effective switching frequency as PP1.5 described above and can retain low harmonic distortion, but it balances the semiconductor temperatures better. The balancing of the temperature possible with the pulse pattern allows for higher output current in the bridge. In this particular example, the bridge output current is increased from 815 amps to 919 amps by utilizing the PP1.5 pattern with adjustment of notch placement. An example of the PP1.5 notch pattern used for these tests is further illustrated in FIG. 11 below.

TABLE 2

| | | Max. Load on Upper IGCT/Diode | | Max Load on Lower IGCT/Diode | | Balanced Load | |
|---|---|---|---|---|---|---|---|
| Device | Parameter | Upper IGCT/Diode | Lower IGCT/Diode | Upper IGCT/Diode | Lower IGCT/Diode | Upper IGCT/Diode | Lower IGCT/Diode |
| IGCT | Hotspot Temp. | 62.95 C. | 63.84 C. | 63.84 C. | 62.95 C. | 63.39 C. | 63.39 C. |
| | Delta Temp. | 0.437 C. | 0.216 C. | 0.216 C. | 0.437 C. | 0.444 C. | 0.444 C. |
| | Ave. Temp. | 114.671 C. | 100.597 C. | 100.597 C. | 114.671 C. | 105.929 C. | 105.929 C. |
| | Max Temp, | 114.918 C. | 100.734 | 100.814 C. | 69.235 C. | 106.182 C. | 106.182 C. |
| Diode | Hotspot Temp. | 62.95 C. | 63.84 C. | 101.70 C. | 69.255 C. | 63.39 C. | 63.39 C. |
| | Delta Temp. | 0.040 C. | 0.519 C. | 0.519 C. | 0.040 C. | 0.531 C. | 0.531 C. |
| | Ave. Temp. | 69.235 C. | 100.814 | 100.814 C. | 69.235 C. | 84.939 C. | 84.939 C. |
| | Max Temp. | 69.255 C. | 101.070 | 101.070 C. | 69.255 C. | 85.201 C. | 85.201 C. |
| IGCT | On switching loss | 173.2 W | 0.0 W | 0.0 W | 173.2 W | 86.6 Q | 86.6 W |
| | Off switching loss | 2224.6 W | 1505.0 W | 1505.0 W | 2224.6 W | 1864.8 W | 1864.8 W |
| | Cond. loss | 649.6 W | 656.7 W | 656.7 W | 649.6 W | 653.1 W | 653.1 W |
| | Leakage loss | 21.8 W | 21.8 W | 21.8 W | 21.8 W | 21.8 W | 21.8 W |
| | Total loss | 3069.2 W | 2183.4 W | 2183.4 W | 3069.2 W | 2626.3 W | 2626.3 W |
| Diode | Rev. Recovery Loss | 0.0 W | 1002.5 W | 1002.5 W | 0.0 W | 501.2 W | 501.2 W |
| | Conduction loss | 186.9 W | 198.4 W | 198.4 W | 186.9 W | 192.7 W | 192.7 W |
| | Leakage Loss | 21.8 W | 21.8 W | 21.8 W | 21.8 W | 21.8 W | 21.8 W |
| | Total Loss | 208.7 W | 1222.7 W | 1222.7 W | 208.7 W | 715.7 W | 715.7 W |

TABLE 3 illustrates the relative capability of the three-phase, wye-connected H-bridge under the aforementioned switching schemes to accommodate higher output current. The PP1.5 pulse pattern provides not only the lowest THD of the original pulse patterns, but highest MVA output on the exemplary 6 MW HSEM. Further, while still maintaining the same notch width, but by relocating the notch position, the H-bridge with the PP1.5 switching pattern may provide an improved 6.28 MVA output compared to an original 5.38 MVA output, before relocation.

TABLE 3

| Pulse Pattern | Switching Frequency | Min. THD (current) | Max. Converter MVA |
|---|---|---|---|
| PP1 | Fundamental x 1 | 2.62% | 3.68 |
| PP2 | Fundamental x 2 | 2.62% | 5.08 |
| PP3 | Fundamental x 3 | 2.62% | 5.38 |
| PP1.5 | Fundamental x 1.5 | 2.49% | 6.28 |

According to one aspect of the invention, a zero-current switching waveform is provided for the three-phase wye-connected H-bridge to power a large high-speed electric motor (HSEM). The switching waveform includes two notches per cycle on the switching waveform provided to each of the semiconductor switches. The switching waveform is referred to as a ZC (Zero Current) notch2 waveform. However, the ZCnotch2 waveform has application to a broader set of motor loads and is not restricted to the application of high-speed motors. Further, the ZCnotch2 waveform may be employed in other multi-phase semiconductor converter bridges, including three-phase bridge full converter circuits, as shown in FIG. 10.

According to the ZCnotch2 switching waveform, notches are placed at or near a line current zero crossing to minimize switching loss and maximize bridge output power capability. IGCT gate drive power is reduced due to the low gate charge for switching events at low current, thereby improving the reliability of IGCT gate drive circuit.

The ZCnotch2 switching waveform makes the effective switching frequency equal to two times the fundamental frequency. However, the semiconductor and gate drive power dissipation is still lower than the PP2 and PP3 input waveforms. The Zcnotch2 switching waveform may further be optimized to equalize power semiconductor losses between upper and lower devices in each leg of the H-bridge, thereby providing margin to operating limits, as previously described for the PP1.5 waveform in TABLE 2. Further, the ZCnotch2 switching waveform utilized in H-bridge, retains the property that the output voltage at the output of every H-bridge is symmetrical, eliminating even harmonics.

The switching signals for the bridge may be controlled by a microprocessor, an integrated circuit, a field programmable gate array (FPGA) or other electronic circuits known in the art.

FIG. 8 provides a graph illustrating input and output waveforms for a three-phase, wye-connected H-bridge employing an inventive optimized ZCNotch2 switching waveform. The ZCnotch2 waveform incorporates a notch of a designated width at a designated offset from the zero-crossing of the load current. The first graph 800 illustrates the ZCnotch2 signals to the upper switches sa_1u, sa_2u, sb_1u sb_2u, sc_1u, and sc_2u (referring to the upper switches in leg1 and leg 2 of phase A, phase B and phase C of the H-bridge converter. The second graph 810 illustrates the voltage between the midpoints of leg 1 and leg 2 of the phase A of the H-bridge. The third graph 820 illustrates the voltage between phase A output and the neutral. The fourth graph 830 illustrates line-to-line voltage between phase A output and phase B output. The fifth graph 840 illustrates load current output. Refer to FIG. 1 for identification of upper switches. Notches 850 on the switching waveform 800 and notches 860 on output voltage waveforms 810) 820, 830 are identified.

TABLEs 4A-4I illustrates optimized results of harmonic performance for with the inventive ZCnotch2 switching waveforms on line current IA, V1-N, V1-1 and Vbridge. TABLE 4A illustrates harmonic performance with a 2-degree notch, positioned 19 degrees from the voltage zero. TABLE 4B illustrates harmonic performance with a 2-degree notch width, positioned 20 degrees from the voltage zero. TABLE 4C illustrates harmonic performance with a 2-degree notch width, positioned 21 degrees from the voltage zero. TABLE 4D illustrates harmonic performance with a 4-degree notch, positioned 18 degrees from the voltage zero. TABLE 4E illustrates harmonic performance with a 4-degree notch, positioned 20 degrees from the voltage zero. TABLE 4F illustrates harmonic performance with a 4-degree notch, positioned 21 degrees from the voltage zero. TABLE 4G illustrates harmonic performance with a 6-degree notch, positioned 20 degrees from the voltage zero. TABLE 4H illustrates harmonic performance with a 3.4-degree notch, positioned 20.4 degrees from the voltage zero.

TABLE 4A

| IA | | V1-n | | V1-1 | | $V_{bridge}$ | |
|---|---|---|---|---|---|---|---|
| THD | 2.25% | THD | 17.54% | THD | 17.51% | THD | 31.73% |
| Fund(A rms) | 963.71 | Fund(A rms) | 2415.47 | Fund(V rms) | 4185 | Fund(V rms) | 2418.81 |
| $2^{nd}$ harmonic | 0.12% | $2^{nd}$ harmonic | 0.22% | $2^{nd}$ harmonic | 0.25% | $2^{nd}$ harmonic | 0.32% |
| $3^{rd}$ harmonic | 0.05% | $3^{rd}$ harmonic | 0.05% | $3^{rd}$ harmonic | 0.10% | $3^{rd}$ harmonic | 23.01% |
| $4^{th}$ harmonic | 0.04% | $4^{th}$ harmonic | 0.27 | $4^{th}$ harmonic | 0.23% | $4^{th}$ harmonic | 0.32% |
| $5^{th}$ harmonic | 1.10% | $5^{th}$ harmonic | 3.58% | $5^{th}$ harmonic | 3.67% | $5^{th}$ harmonic | 3.62% |
| $6^{th}$ harmonic | 0.00% | $6^{th}$ harmonic | 0.22% | $6^{th}$ harmonic | 0.11% | $6^{th}$ harmonic | 0.32% |
| $7^{th}$ harmonic | 1.25% | $7^{th}$ harmonic | 5.21% | $7^{th}$ harmonic | 5.16% | $7^{th}$ harmonic | 5.21% |
| $8^{th}$ harmonic | 0.02% | $8^{th}$ harmonic | 0.27% | $8^{th}$ harmonic | 0.22% | $8^{th}$ harmonic | 0.32% |
| $9^{th}$ harmonic | 0.02% | $9^{th}$ harmonic | 0.09% | $9^{th}$ harmonic | 0.14% | $9^{th}$ harmonic | 8.38% |
| $10^{th}$ harmonic | 0.13% | $10^{th}$ harmonic | 0.22% | $10^{th}$ harmonic | 0.25% | $10^{th}$ harmonic | 0.32% |
| $11^{th}$ harmonic | 1.20% | $11^{th}$ harmonic | 7.95% | $11^{th}$ harmonic | 7.95% | $11^{th}$ harmonic | 8.07% |
| $12^{th}$ harmonic | 0.00% | $12^{th}$ harmonic | 0.11% | $12^{th}$ harmonic | 0.08% | $12^{th}$ harmonic | 0.32% |
| $13^{th}$ harmonic | 0.74% | $13^{th}$ harmonic | 5.96% | $13^{th}$ harmonic | 5.94% | $13^{th}$ harmonic | 5.91% |
| $14^{th}$ harmonic | 0.02% | $14^{th}$ harmonic | 0.22% | $14^{th}$ harmonic | 0.25% | $14^{th}$ harmonic | 0.32% |
| $15^{th}$ harmonic | 0.01% | $15^{th}$ harmonic | 0.06% | $15^{th}$ harmonic | 0.10% | $15^{th}$ harmonic | 3.43% |
| $16^{th}$ harmonic | 0.11% | $16^{th}$ harmonic | 0.27% | $16^{th}$ harmonic | 0.23% | $16^{th}$ harmonic | 0.32% |

TABLE 4A-continued

| IA | | Vl-n | | Vl-1 | | V_bridge | |
|---|---|---|---|---|---|---|---|
| THD | 2.25% | THD | 17.54% | THD | 17.51% | THD | 31.73% |
| Fund(A rms) | 963.71 | Fund(A rms) | 2415.47 | Fund(V rms) | 4185 | Fund(V rms) | 2418.81 |
| 17th harmonic | 0.20% | 17th harmonic | 1.98% | 17th harmonic | 1.99% | 17th harmonic | 2.01% |
| 18th harmonic | 0.00% | 18th harmonic | 0.22% | 18th harmonic | 0.11% | 18th harmonic | 0.32% |
| 19th harmonic | 0.17% | 19th harmonic | 1.97% | 19th harmonic | 1.98% | 19th harmonic | 1.96% |

TABLE 4B

| IA | | Vl-n | | Vl-1 | | V_bridge | |
|---|---|---|---|---|---|---|---|
| THD | 2.23% | THD | 17.90% | THD | 17.83% | THD | 31.73% |
| Fund(A rms) | 963.39 | Fund(A rms) | 2411.31 | Fund(V rms) | 4172.16 | Fund(V rms) | 2412.78 |
| 2nd harmonic | 0.12% | 2nd harmonic | 0.22% | 2nd harmonic | 0.25% | 2nd harmonic | 0.32% |
| 3rd harmonic | 0.05% | 3rd harmonic | 0.39% | 3rd harmonic | 0.39% | 3rd harmonic | 22.46% |
| 4th harmonic | 0.04% | 4th harmonic | 0.27% | 4th harmonic | 0.23% | 4th harmonic | 0.32% |
| 5th harmonic | 1.12% | 5th harmonic | 3.24% | 5th harmonic | 3.35% | 5th harmonic | 3.11% |
| 6th harmonic | 0.00% | 6th harmonic | 0.22% | 6th harmonic | 0.11% | 6th harmonic | 0.32% |
| 7th harmonic | 1.22% | 7th harmonic | 5.44% | 7th harmonic | 5.19% | 7th harmonic | 5.59% |
| 8th harmonic | 0.02% | 8th harmonic | 0.27% | 8th harmonic | 0.23% | 8th harmonic | 0.32% |
| 9th harmonic | 0.02% | 9th harmonic | 0.36% | 9th harmonic | 0.26% | 9th harmonic | 8.17% |
| 10th harmonic | 0.03% | 10th harmonic | 0.22% | 10th harmonic | 0.26% | 10th harmonic | 0.32% |
| 11th harmonic | 1.15% | 11th harmonic | 7.41% | 11th harmonic | 7.64% | 11th harmonic | 7.38% |
| 12th harmonic | 0.00% | 12th harmonic | 0.11% | 12th harmonic | 0.08% | 12th harmonic | 0.32% |
| 13th harmonic | 0.73% | 13th harmonic | 5.52% | 13th harmonic | 5.65% | 13th harmonic | 5.26% |
| 14th harmonic | 0.02% | 14th harmonic | 0.22% | 14th harmonic | 0.25% | 14th harmonic | 0.32% |
| 15th harmonic | 0.01% | 15th harmonic | 0.45% | 15th harmonic | 0.47% | 15th harmonic | 3.63% |
| 16th harmonic | 0.01% | 16th harmonic | 0.27% | 16th harmonic | 0.23% | 16th harmonic | 0.32% |
| 17th harmonic | 0.24% | 17th harmonic | 2.68% | 17th harmonic | 2.52% | 17th harmonic | 2.92% |
| 18th harmonic | 0.00% | 18th harmonic | 0.22% | 18th harmonic | 0.11% | 18th harmonic | 0.32% |
| 19th harmonic | 0.13% | 19th harmonic | 1.88% | 19th harmonic | 1.72% | 19th harmonic | 1.99% |

TABLE 4C

| IA | | Vl-n | | Vl-1 | | V_bridge | |
|---|---|---|---|---|---|---|---|
| THD | 2.23% | THD | 18.00% | THD | 17.90% | THD | 31.96% |
| Fund(A rms) | 963.07 | Fund(A rms) | 2408.85 | Fund(V rms) | 4182.23 | Fund(V rms) | 2417.21 |
| 2nd harmonic | 0.12% | 2nd harmonic | 0.22% | 2nd harmonic | 0.25% | 2nd harmonic | 0.32% |
| 3rd harmonic | 0.05% | 3rd harmonic | 0.25% | 3rd harmonic | 0.10% | 3rd harmonic | 22.92% |
| 4th harmonic | 0.04% | 4th harmonic | 0.27% | 4th harmonic | 0.23% | 4th harmonic | 0.32% |
| 5th harmonic | 1.15% | 5th harmonic | 3.55% | 5th harmonic | 3.80% | 5th harmonic | 3.76% |
| 6th harmonic | 0.00% | 6th harmonic | 0.22% | 6th harmonic | 0.11% | 6th harmonic | 0.32% |
| 7th harmonic | 1.18% | 7th harmonic | 4.91% | 7th harmonic | 4.86% | 7th harmonic | 4.91% |
| 8th harmonic | 0.02% | 8th harmonic | 0.27% | 8th harmonic | 0.22% | 8th harmonic | 0.32% |
| 9th harmonic | 0.02% | 9th harmonic | 0.26% | 9th harmonic | 0.13% | 9th harmonic | 7.75% |
| 10th harmonic | 0.03% | 10th harmonic | 0.22% | 10th harmonic | 0.25% | 10th harmonic | 0.32% |
| 11th harmonic | 1.12% | 11th harmonic | 7.46% | 11th harmonic | 7.40% | 11th harmonic | 7.50% |
| 12th harmonic | 0.00% | 12th harmonic | 0.11% | 12th harmonic | 0.08% | 12th harmonic | 0.32% |
| 13th harmonic | 0.74% | 13th harmonic | 5.97% | 13th harmonic | 6.00% | 13th harmonic | 5.96% |
| 14th harmonic | 0.02% | 14th harmonic | 0.22% | 14th harmonic | 0.25% | 14th harmonic | 0.32% |
| 15th harmonic | 0.01% | 15th harmonic | 0.14% | 15th harmonic | 0.13% | 15th harmonic | 4.35% |
| 16th harmonic | 0.01% | 16th harmonic | 0.27% | 16th harmonic | 0.23% | 16th harmonic | 0.32% |
| 17th harmonic | 0.27% | 17th harmonic | 2.73% | 17th harmonic | 2.81% | 17th harmonic | 2.53% |
| 18th harmonic | 0.00% | 18th harmonic | 0.22% | 18th harmonic | 0.11% | 18th harmonic | 0.32% |
| 19th harmonic | 0.09% | 19th harmonic | 1.11% | 19th harmonic | 1.12% | 19th harmonic | 1.07% |

TABLE 4D

| IA | | Vl-n | | Vl-1 | | V_bridge | |
|---|---|---|---|---|---|---|---|
| THD | 2.23% | THD | 18.1% | THD | 18.04% | THD | 31.41% |
| Fund(A rms) | 958.17 | Fund(A rms) | 2400.66 | Fund(V rms) | 4159.91 | Fund(V rms) | 2403.7 |
| 2nd harmonic | 0.12% | 2nd harmonic | 0.22% | 2nd harmonic | 0.25% | 2nd harmonic | 0.32% |
| 3rd harmonic | 0.05% | 3rd harmonic | 0.11% | 3rd harmonic | 0.17% | 3rd harmonic | 22.92% |
| 4th harmonic | 0.04% | 4th harmonic | 0.27% | 4th harmonic | 0.23% | 4th harmonic | 0.32% |
| 5th harmonic | 0.57% | 5th harmonic | 1.81% | 5th harmonic | 1.85% | 5th harmonic | 3.76% |
| 6th harmonic | 0.00% | 6th harmonic | 0.22% | 6th harmonic | 0.11% | 6th harmonic | 0.32% |

TABLE 4D-continued

| IA | | Vl-n | | Vl-1 | | $V_{bridge}$ | |
|---|---|---|---|---|---|---|---|
| THD | 2.23% | THD | 18.1% | THD | 18.04% | THD | 31.41% |
| Fund(A rms) | 958.17 | Fund(A rms) | 2400.66 | Fund(V rms) | 4159.91 | Fund(V rms) | 2403.7 |
| $7^{th}$ harmonic | 1.62% | $7^{th}$ harmonic | 6.87% | $7^{th}$ harmonic | 6.78% | $7^{th}$ harmonic | 4.91% |
| $8^{th}$ harmonic | 0.02% | $8^{th}$ harmonic | 0.27% | $8^{th}$ harmonic | 0.23% | $8^{th}$ harmonic | 0.32% |
| $9^{th}$ harmonic | 0.02% | $9^{th}$ harmonic | 0.16% | $9^{th}$ harmonic | 0.13% | $9^{th}$ harmonic | 7.75% |
| $10^{th}$ harmonic | 0.03% | $10^{th}$ harmonic | 0.22% | $10^{th}$ harmonic | 0.26% | $10^{th}$ harmonic | 0.32% |
| $11^{th}$ harmonic | 1.10% | $11^{th}$ harmonic | 7.20% | $11^{th}$ harmonic | 7.27% | $11^{th}$ harmonic | 7.50% |
| $12^{th}$ harmonic | 0.00% | $12^{th}$ harmonic | 0.11% | $12^{th}$ harmonic | 0.08% | $12^{th}$ harmonic | 0.32% |
| $13^{th}$ harmonic | 0.53% | $13^{th}$ harmonic | 4.27% | $13^{th}$ harmonic | 4.40% | $13^{th}$ harmonic | 5.96% |
| $14^{th}$ harmonic | 0.02% | $14^{th}$ harmonic | 0.22% | $14^{th}$ harmonic | 0.25% | $14^{th}$ harmonic | 0.32% |
| $15^{th}$ harmonic | 0.01% | $15^{th}$ harmonic | 0.29% | $15^{th}$ harmonic | 0.33% | $15^{th}$ harmonic | 4.35% |
| $16^{th}$ harmonic | 0.01% | $16^{th}$ harmonic | 0.27% | $16^{th}$ harmonic | 0.23% | $16^{th}$ harmonic | 0.32% |
| $17^{th}$ harmonic | 0.33% | $17^{th}$ harmonic | 3.43% | $17^{th}$ harmonic | 3.47% | $17^{th}$ harmonic | 2.53% |
| $18^{th}$ harmonic | 0.00% | $18^{th}$ harmonic | 0.22% | $18^{th}$ harmonic | 0.11% | $18^{th}$ harmonic | 0.32% |
| $19^{th}$ harmonic | 0.29% | $19^{th}$ harmonic | 3.32% | $19^{th}$ harmonic | 3.26% | $19^{th}$ harmonic | 1.07% |

TABLE 4E

| IA | | Vl-n | | Vl-1 | | $V_{bridge}$ | |
|---|---|---|---|---|---|---|---|
| THD | 2.17% | THD | 18.73% | THD | 18.70% | THD | 31.72% |
| Fund(A rms) | 956.95 | Fund(A rms) | 2398.19 | Fund(V rms) | 4155.07 | Fund(V rms) | 2401.56 |
| $2^{nd}$ harmonic | 0.12% | $2^{nd}$ harmonic | 0.22% | $2^{nd}$ harmonic | 0.25% | $2^{nd}$ harmonic | 0.32% |
| $3^{rd}$ harmonic | 0.05% | $3^{rd}$ harmonic | 0.04% | $3^{rd}$ harmonic | 0.09% | $3^{rd}$ harmonic | 21.39% |
| $4^{th}$ harmonic | 0.04% | $4^{th}$ harmonic | 0.27% | $4^{th}$ harmonic | 0.23% | $4^{th}$ harmonic | 0.32% |
| $5^{th}$ harmonic | 0.72% | $5^{th}$ harmonic | 2.17% | $5^{th}$ harmonic | 2.26% | $5^{th}$ harmonic | 2.23% |
| $6^{th}$ harmonic | 0.00% | $6^{th}$ harmonic | 0.22% | $6^{th}$ harmonic | 0.11% | $6^{th}$ harmonic | 0.32% |
| $7^{th}$ harmonic | 1.52% | $7^{th}$ harmonic | 6.53% | $7^{th}$ harmonic | 6.50% | $7^{th}$ harmonic | 6.54% |
| $8^{th}$ harmonic | 0.02% | $8^{th}$ harmonic | 0.27% | $8^{th}$ harmonic | 0.23% | $8^{th}$ harmonic | 0.32% |
| $9^{th}$ harmonic | 0.02% | $9^{th}$ harmonic | 0.13% | $9^{th}$ harmonic | 0.16% | $9^{th}$ harmonic | 8.10% |
| $10^{th}$ harmonic | 0.03% | $10^{th}$ harmonic | 0.22% | $10^{th}$ harmonic | 0.26% | $10^{th}$ harmonic | 0.32% |
| $11^{th}$ harmonic | 0.92% | $11^{th}$ harmonic | 6.16% | $11^{th}$ harmonic | 6.22% | $11^{th}$ harmonic | 6.33% |
| $12^{th}$ harmonic | 0.00% | $12^{th}$ harmonic | 0.11% | $12^{th}$ harmonic | 0.08% | $12^{th}$ harmonic | 0.32% |
| $13^{th}$ harmonic | 0.55% | $13^{th}$ harmonic | 4.35% | $13^{th}$ harmonic | 4.26% | $13^{th}$ harmonic | 4.23% |
| $14^{th}$ harmonic | 0.02% | $14^{th}$ harmonic | 0.22% | $14^{th}$ harmonic | 0.25% | $14^{th}$ harmonic | 0.32% |
| $15^{th}$ harmonic | 0.01% | $15^{th}$ harmonic | 0.19% | $15^{th}$ harmonic | 0.17% | $15^{th}$ harmonic | 4.15% |
| $16^{th}$ harmonic | 0.01% | $16^{th}$ harmonic | 0.27% | $16^{th}$ harmonic | 0.23% | $16^{th}$ harmonic | 0.32% |
| $17^{th}$ harmonic | 0.42% | $17^{th}$ harmonic | 4.21% | $17^{th}$ harmonic | 4.14% | $17^{th}$ harmonic | 4.22% |
| $18^{th}$ harmonic | 0.00% | $18^{th}$ harmonic | 0.22% | $18^{th}$ harmonic | 0.11% | $18^{th}$ harmonic | 0.32% |
| $19^{th}$ harmonic | 0.21% | $19^{th}$ harmonic | 2.62% | $19^{th}$ harmonic | 2.79% | $19^{th}$ harmonic | 2.69% |

TABLE 4F

| IA | | Vl-n | | Vl-1 | | $V_{bridge}$ | |
|---|---|---|---|---|---|---|---|
| THD | 2.18% | THD | 19.20% | THD | 19.18% | THD | 32.03% |
| Fund(A rms) | 956.35 | Fund(A rms) | 2396.12 | Fund(V rms) | 4151.38 | Fund(V rms) | 2399.42 |
| $2^{nd}$ harmonic | 0.12% | $2^{nd}$ harmonic | 0.22% | $2^{nd}$ harmonic | 0.25% | $2^{nd}$ harmonic | 0.32% |
| $3^{rd}$ harmonic | 0.05% | $3^{rd}$ harmonic | 0.07% | $3^{rd}$ harmonic | 0.09% | $3^{rd}$ harmonic | 21.28% |
| $4^{th}$ harmonic | 0.04% | $4^{th}$ harmonic | 0.27% | $4^{th}$ harmonic | 0.23% | $4^{th}$ harmonic | 0.32% |
| $5^{th}$ harmonic | 0.81% | $5^{th}$ harmonic | 2.57% | $5^{th}$ harmonic | 2.66% | $5^{th}$ harmonic | 2.63% |
| $6^{th}$ harmonic | 0.00% | $6^{th}$ harmonic | 0.22% | $6^{th}$ harmonic | 0.11% | $6^{th}$ harmonic | 0.32% |
| $7^{th}$ harmonic | 1.46% | $7^{th}$ harmonic | 6.29% | $7^{th}$ harmonic | 6.15% | $7^{th}$ harmonic | 6.19% |
| $8^{th}$ harmonic | 0.02% | $8^{th}$ harmonic | 0.27% | $8^{th}$ harmonic | 0.23% | $8^{th}$ harmonic | 0.32% |
| $9^{th}$ harmonic | 0.02% | $9^{th}$ harmonic | 0.06% | $9^{th}$ harmonic | 0.14% | $9^{th}$ harmonic | 7.27% |
| $10^{th}$ harmonic | 0.03% | $10^{th}$ harmonic | 0.22% | $10^{th}$ harmonic | 0.26% | $10^{th}$ harmonic | 0.32% |
| $11^{th}$ harmonic | 0.86% | $11^{th}$ harmonic | 5.71% | $11^{th}$ harmonic | 5.61% | $11^{th}$ harmonic | 5.69% |
| $12^{th}$ harmonic | 0.00% | $12^{th}$ harmonic | 0.11% | $12^{th}$ harmonic | 0.08% | $12^{th}$ harmonic | 0.32% |
| $13^{th}$ harmonic | 0.62% | $13^{th}$ harmonic | 4.88% | $13^{th}$ harmonic | 4.99% | $13^{th}$ harmonic | 4.93% |
| $14^{th}$ harmonic | 0.02% | $14^{th}$ harmonic | 0.22% | $14^{th}$ harmonic | 0.25% | $14^{th}$ harmonic | 0.32% |
| $15^{th}$ harmonic | 0.01% | $15^{th}$ harmonic | 0.08% | $15^{th}$ harmonic | 0.20% | $15^{th}$ harmonic | 5.44% |
| $16^{th}$ harmonic | 0.01% | $16^{th}$ harmonic | 0.27% | $16^{th}$ harmonic | 0.23% | $16^{th}$ harmonic | 0.32% |
| $17^{th}$ harmonic | 0.45% | $17^{th}$ harmonic | 4.51% | $17^{th}$ harmonic | 4.69% | $17^{th}$ harmonic | 4.75% |
| $18^{th}$ harmonic | 0.00% | $18^{th}$ harmonic | 0.22% | $18^{th}$ harmonic | 0.11% | $18^{th}$ harmonic | 0.32% |
| $19^{th}$ harmonic | 0.19% | $19^{th}$ harmonic | 2.46% | $19^{th}$ harmonic | 2.43% | $19^{th}$ harmonic | 2.30% |

TABLE 4G

| IA | | Vl-n | | Vl-l | | $V_{bridge}$ | |
|---|---|---|---|---|---|---|---|
| THD | 2.23% | THD | 18.00% | THD | 17.90% | THD | 31.96% |
| Fund(A rms) | 949.33 | Fund(A rms) | 2377.52 | Fund(V rms) | 4119.12 | Fund(V rms) | 2380.82 |
| $2^{nd}$ harmonic | 0.12% | $2^{nd}$ harmonic | 0.23% | $2^{nd}$ harmonic | 0.26% | $2^{nd}$ harmonic | 0.32% |
| $3^{rd}$ harmonic | 0.04% | $3^{rd}$ harmonic | 0.07% | $3^{rd}$ harmonic | 0.08% | $3^{rd}$ harmonic | 19.58% |
| $4^{th}$ harmonic | 0.04% | $4^{th}$ harmonic | 0.27 | $4^{th}$ harmonic | 0.23% | $4^{th}$ harmonic | 0.32% |
| $5^{th}$ harmonic | 0.92% | $5^{th}$ harmonic | 2.85% | $5^{th}$ harmonic | 2.96% | $5^{th}$ harmonic | 2.98% |
| $6^{th}$ harmonic | 0.00% | $6^{th}$ harmonic | 0.22% | $6^{th}$ harmonic | 0.11% | $6^{th}$ harmonic | 0.32% |
| $7^{th}$ harmonic | 1.74% | $7^{th}$ harmonic | 7.61% | $7^{th}$ harmonic | 7.45% | $7^{th}$ harmonic | 7.46% |
| $8^{th}$ harmonic | 0.02% | $8^{th}$ harmonic | 0.27% | $8^{th}$ harmonic | 0.23% | $8^{th}$ harmonic | 0.32% |
| $9^{th}$ harmonic | 0.02% | $9^{th}$ harmonic | 0.06% | $9^{th}$ harmonic | 0.16% | $9^{th}$ harmonic | 6.75% |
| $10^{th}$ harmonic | 0.03% | $10^{th}$ harmonic | 0.22% | $10^{th}$ harmonic | 0.26% | $10^{th}$ harmonic | 0.32% |
| $11^{th}$ harmonic | 0.59% | $11^{th}$ harmonic | 3.89% | $11^{th}$ harmonic | 3.78% | $11^{th}$ harmonic | 3.62% |
| $12^{th}$ harmonic | 0.00% | $12^{th}$ harmonic | 0.11% | $12^{th}$ harmonic | 0.19% | $12^{th}$ harmonic | 0.32% |
| $13^{th}$ harmonic | 0.67% | $13^{th}$ harmonic | 5.40% | $13^{th}$ harmonic | 5.51% | $13^{th}$ harmonic | 5.40% |
| $14^{th}$ harmonic | 0.02% | $14^{th}$ harmonic | 0.22% | $14^{th}$ harmonic | 0.25% | $14^{th}$ harmonic | 0.32% |
| $15^{th}$ harmonic | 0.02% | $15^{th}$ harmonic | 0.08% | $15^{th}$ harmonic | 0.27% | $15^{th}$ harmonic | 7.35% |
| $16^{th}$ harmonic | 0.01% | $16^{th}$ harmonic | 0.28% | $16^{th}$ harmonic | 0.23% | $16^{th}$ harmonic | 0.32% |
| $17^{th}$ harmonic | 0.61% | $17^{th}$ harmonic | 6.15% | $17^{th}$ harmonic | 6.35% | $17^{th}$ harmonic | 6.44% |
| $18^{th}$ harmonic | 0.00% | $18^{th}$ harmonic | 0.22% | $18^{th}$ harmonic | 0.11% | $18^{th}$ harmonic | 0.32% |
| $19^{th}$ harmonic | 0.29% | $19^{th}$ harmonic | 3.68% | $19^{th}$ harmonic | 3.67% | $19^{th}$ harmonic | 3.52% |

TABLE 4H

| IA | | Vl-n | | Vl-l | | $V_{bridge}$ | |
|---|---|---|---|---|---|---|---|
| THD | 2.16% | THD | 18.57% | THD | 18.54% | THD | 31.87% |
| Fund(A rms) | 958.71 | Fund(A rms) | 2402.96 | Fund(V rms) | 4163.34 | Fund(V rms) | 2406.33 |
| $2^{nd}$ harmonic | 0.12% | $2^{nd}$ harmonic | 0.22% | $2^{nd}$ harmonic | 0.25% | $2^{nd}$ harmonic | 0.32% |
| $3^{rd}$ harmonic | 0.05% | $3^{rd}$ harmonic | 0.04% | $3^{rd}$ harmonic | 0.09% | $3^{rd}$ harmonic | 21.88% |
| $4^{th}$ harmonic | 0.04% | $4^{th}$ harmonic | 0.27 | $4^{th}$ harmonic | 0.23% | $4^{th}$ harmonic | 0.32% |
| $5^{th}$ harmonic | 0.84% | $5^{th}$ harmonic | 2.69% | $5^{th}$ harmonic | 2.79% | $5^{th}$ harmonic | 2.74% |
| $6^{th}$ harmonic | 0.00% | $6^{th}$ harmonic | 0.22% | $6^{th}$ harmonic | 0.11% | $6^{th}$ harmonic | 0.32% |
| $7^{th}$ harmonic | 1.41% | $7^{th}$ harmonic | 5.92% | $7^{th}$ harmonic | 5.88% | $7^{th}$ harmonic | 5.92% |
| $8^{th}$ harmonic | 0.02% | $8^{th}$ harmonic | 0.27% | $8^{th}$ harmonic | 0.23% | $8^{th}$ harmonic | 0.32% |
| $9^{th}$ harmonic | 0.02% | $9^{th}$ harmonic | 0.11% | $9^{th}$ harmonic | 0.14% | $9^{th}$ harmonic | 7.80% |
| $10^{th}$ harmonic | 0.03% | $10^{th}$ harmonic | 0.22% | $10^{th}$ harmonic | 0.26% | $10^{th}$ harmonic | 0.32% |
| $11^{th}$ harmonic | 0.97% | $11^{th}$ harmonic | 6.41% | $11^{th}$ harmonic | 6.46% | $11^{th}$ harmonic | 6.56% |
| $12^{th}$ harmonic | 0.00% | $12^{th}$ harmonic | 0.11% | $12^{th}$ harmonic | 0.08% | $12^{th}$ harmonic | 0.32% |
| $13^{th}$ harmonic | 0.61% | $13^{th}$ harmonic | 4.97% | $13^{th}$ harmonic | 4.90% | $13^{th}$ harmonic | 4.86% |
| $14^{th}$ harmonic | 0.02% | $14^{th}$ harmonic | 0.22% | $14^{th}$ harmonic | 0.25% | $14^{th}$ harmonic | 0.32% |
| $15^{th}$ harmonic | 0.01% | $15^{th}$ harmonic | 0.16% | $15^{th}$ harmonic | 0.16% | $15^{th}$ harmonic | 4.36% |
| $16^{th}$ harmonic | 0.01% | $16^{th}$ harmonic | 0.27% | $16^{th}$ harmonic | 0.23% | $16^{th}$ harmonic | 0.32% |
| $17^{th}$ harmonic | 0.38% | $17^{th}$ harmonic | 3.85% | $17^{th}$ harmonic | 3.80% | $17^{th}$ harmonic | 3.86% |
| $18^{th}$ harmonic | 0.00% | $18^{th}$ harmonic | 0.22% | $18^{th}$ harmonic | 0.11% | $18^{th}$ harmonic | 0.32% |
| $19^{th}$ harmonic | 0.17% | $19^{th}$ harmonic | 2.01% | $19^{th}$ harmonic | 2.17% | $19^{th}$ harmonic | 2.07% |

An analysis was performed to compare the thermal performance of the PP1.5 switching waveform with the ZCnotch2 switching waveform at maximum current for each application. In the following example using a SABER analysis, a 600 Hz sine wave modulated by the ZCnotch2 switching waveform is compared with a 600 Hz sine wave is modulated by the PP1.5 PP switching waveform. For the example, the three-phase, wye-connected H-bridge employed ABB 5SHX 35L4511 IGCT with Eoff reduced by 22.5% with RC snubbers, with Eupec D1331SH diode. System parameters included a 3300 VAC 0.8 PF motor with 2800 VDC link, 40 degree C. water temperature and 115° C. maximum junction temperature. Results of the analysis are provided as TABLE 5. Switching with the ZCnotch2 waveform compared to the PP1.5 waveform resulted in lower total IGCT power loss, comparable IGCT temperature, comparable diode temperature and a slightly higher, but acceptable diode loss. TABLE 6 identifies the parameters employed in the SABER analysis of the H-bridge operation. While the ZCnotch2 waveform provided comparable thermal performance to the PP1.5 switching waveform for the semiconductor switching devices, the ZCnotch2 waveform was tested at 1463 amps compared to the PP1.5 waveform performance at 1373 amps, indicating greater MVA capability with the ZCnotch2 use, as identified in TABLE 7.

TABLE 5

| Device | Parameter | 600 Hz sine wave modulated with ZCnotch2 pulse pattern | 600 Hz sine wave modulated with PP 1.5 |
|---|---|---|---|
| IGCT | Hotspot Temp. | 68.74 C. | 68.83 C. |
| | Delta Temp. | 0.23 C. | 0.025 C. |
| | Ave. Temp. | 114.81 C. | 114.81 C. |
| | Max Temp. | 114.94 C. | 114..94 C. |
| Diode | Hotspot Temp. | 48.85 C. | 47.73 C. |
| | Delta Temp. | 0.17 C. | 0.26 C. |
| | Ave. Temp. | 63.65 C. | 61.21 C. |
| | Max Temp. | 63.74 C. | 61.33 C. |
| IGCT | On switching loss | 32.4 W | 44.5 W |
| | Off switching loss | 2606.4 W | 2747.4 W |
| | Cond. loss | 1423.1 W | 1283.7 W |

TABLE 5-continued

| Device | Parameter | 600 Hz sine wave modulated with ZCnotch2 pulse pattern | 600 Hz sine wave modulated with PP 1.5 |
|---|---|---|---|
| | Leakage loss | 43.6 W | 43.6 W |
| | Total loss | 4105.5 W | 4119.2 W |
| Diode | Rev. Recovery Loss | 819.6 W | 670.3 W |
| | Conduction loss | 314.5 W | 303.0 W |
| | Leakage Loss | 130.7 W | 130.7 W |
| | Total Loss | 1264.8 W | 1104.0 W |

TABLE 6

| Parameter | ZCnotch2 | PP1.5 | Units |
|---|---|---|---|
| Vbus actual | 2800 | 2800 | V |
| Current | 1463 | 1373 | A RMS |
| Voltage L-L | 4206 | 4206 | V RMS |
| Power Factor | 0.63 | 0.63 | |
| Output Frequency | 600 | 600 | Hz |
| Switching Frequency | 1200 | 900 | Hz |

TABLE 6-continued

| Parameter | ZCnotch2 | PP1.5 | Units |
|---|---|---|---|
| IGCT Conduction Voltage | 1.4 | 1.4 | V |
| IGCT Conduction Res. | 0.0007 | 0.0007 | Ohm |
| IGCT On Switch Loss | 0.324 | 0.324 | Joules at |
| IGCT Off Switch Loss | 4.038 | 4.038 | Joules at |
| IGCT Thermal tau | 0.25 | 0.25 | Second |
| IGCT Thermal res J-hs | 0.0115 | 0.0115 | C/W |
| Diode Conduction Voltage | 1.2 | 1.2 | Volt |
| Diode Conduction Res. | 0.0014 | 0.0014 | Ohm |
| Diode Thermal tau | 0.2 | 0.2 | Second |
| Diode Thermal Res J-hs | 0.01105 | 0.01105 | C/W |
| Water Temperature | 40 | 40 | Degree |
| Thermal Resistance HS-water | 0.007 | 0.007 | C/W |
| Power Flow | From Line | From Line | |
| Power Factor | Lagging | Lagging | |

TABLE 7

| Pulse Pattern | Switching Frequency | Min. THD (current) | Max, Converter MVA |
|---|---|---|---|
| PP1.5 | Fundamental x 1.5 | 2.49% | 6.28 |
| ZCNotch2 | Fundamental x 2 | 2.16% | 6.69 |

Further, another aspect of the invention includes a control scheme for the motor to optimize THD over the full range of motor speed. In such a case, use of the ZCnotch2 switching signal may be employed over the range of speed operation for which it minimizes THD. In an exemplary case for a 6 MW high-speed electric motor, simulations were performed in SABER at each operating point, and the voltage was exported into a spreadsheet to calculate the current harmonics. Waveforms from each simulation were recorded. For operating speeds approximately 10% to about 60%, a pulse-width modulation (PWM) scheme with sine-triangle modulation provided the lowest THD. For operation from about 70% to 90% speed, the ZCnotch2 switching waveform is used, yielding the lowest THD. At 100% speed, synchronous switching with no notches is employed.

FIGS. 9A-9J illustrate the line voltages to neutral voltage $(v_a - v_n)$ 900 for a phase of three-phase, wye-connected H-bridge converter and the line current (ia) 910 where the bridge is driving the exemplary high-speed 6 MW motor over the full speed range. TABLE 8 summarizes the converter parameters, control strategies and THD performance over the full speed range for the exemplary 6 MW high-speed electric motor.

TABLE 8

| Speed | Output V L-L | Motor Freq. Hz | Motor Input MW | Fund. Current A RMS | Tot. Current A RMS | Current THD | Modulation |
|---|---|---|---|---|---|---|---|
| 100% | 4160 | 566.67 | 6.205 | 1068 | 1069 | 2.14% | No Notch |
| 90% | 3744 | 510 | 4.523 | 865 | 866 | 4.42% | ZCnotch2 |
| 80% | 3328 | 453.33 | 3.177 | 684 | 685 | 5.52% | ZCnotch2 |
| 70% | 2912 | 396.67 | 2.128 | 523 | 525 | 8.18% | ZCnotch2 |
| 60% | 2496 | 340 | 1.340 | 384 | 398 | 26.8% | 1000 HzPWM |
| 50% | 2080 | 283.33 | 0.776 | 267 | 303 | 54.0% | 1000 HzPWM |
| 40% | 1664 | 226.67 | 0.397 | 171 | 202 | 63.3% | 1000 HzPWM |
| 30% | 1248 | 170 | 0.168 | 96 | 134 | 97.4% | 1000 HzPWM |
| 20% | 832 | 113.33 | 0.050 | 43 | 91 | 185.9% | 1000 HzPWM |
| 10% | 416 | 56.67 | 0.006 | 11 | 64 | 571.7% | 1000 HzPWM |

Further, while an exemplary 6 MW HSEM has been described in the analysis, application of the ZCnotch2 switching signal to HSEMs with other ratings is considered within the scope of the invention.

FIG. 10 illustrates an exemplary simplified three-leg, three-phase bridge converter 1000 for driving a three-phase motor load 1095. Each phase of the converter 1000 includes a power source/sink 1020 with a dc power shaping circuit, represented by capacitor 1030. The power source/sink/1020 and dc power shaping circuit, represented by capacitor 1030, establish a dc-link voltage input to the semiconductor switches 1040 of the bridge. As previously described, insulated-gate bipolar transistors (IGBTs) with built-in diodes may form each leg of the semiconductor bridge 1050, for example, but other power semiconductor switches such as integrated-gate commutated thyristors (IGCTs) or metal-oxide semiconductor field-effect transistors (MOSFETs) could be used instead. The type of power semiconductor switch is not important to the analysis. Each bridge includes three legs, 1065, 1075, and 1085. Each phase output, phase A 1060, phase B 1070 and phase C 108080 is connected to the midpoint 1055 of the respective bridge leg. A ZCnotch2 switching waveform may be supplied to the switching control inputs 1045 for the semiconductor switches 1040. The ZCnotch2 switching waveform may also be utilized in other standard semiconductor bridge converters and multi-phase semiconductor H-bridge converters in addition to the three-phase, wye-connected H-bridge converter, previously described.

FIG. 11 illustrates another example gating control signal that may be delivered to a controller for powering a load, including adjusted notch positions to improve at least one of temperature balance, switching or power losses, or harmonic distortions, but that is not a ZCnotch2 switching waveform. The gating control signal includes a switching pattern 1110 having a switching frequency approximately 1.5 times the fundamental frequency of the switching pattern (e.g., PP1.5 as described with reference to FIG. 3 above). As described, the switching pattern 1110 of the gating may include at least two notches 1120, 1130. The notches 1120, 1130 of the switching pattern 1110 are positioned such that the switching frequency is approximately 1.5 times the fundamental frequency, such as placing them greater than approximately 360 degrees apart and less than approximately 720 degrees apart. As illustrated in FIG. 11, a second notch 1130 is positioned approximately 560 degrees from a first notch 1120. However, in other example embodiments of a gating signal, the switching pattern 1110 may include notches positioned such that the switching frequency is approximately between 1 times and 2 times the fundamental frequency, and need not be exactly or substantially near 1.5 times the fundamental frequency. The notch width of the notches 1120, 1130 may be of any width, though in some example embodiments, the notch width may vary between approximately 0.1 degrees to approximately 20 degrees.

As illustrated in FIG. 11, the example switching pattern 1110 may have the notches 1120, 1130 positioned such that the switching event caused by the notch 1130 occurs at a positive slope of the reference voltage ("Vref") 1140 of the gating control signal and subsequently at a negative slope of the Vref by the next notch 1120. Positioning the notches 1120, 1130 in this manner to alternate between placement with Vref 1140 having a positive slope and a negative slope acts to better balance the switching loss, peak temperatures, and thus the power loss, between the upper and lower IGCT and/or diodes of the controller semiconductors. In contrast, a switching pattern that positions the notches to always occur when Vref 1140 is negative (or alternatively when Vref 1140 is positive) continues to stress the same pair of diodes, increasing the peak temperatures and increasing the switching loss occurring. Table 2 above further describes the effects on the IGCT and diodes resulting from imbalanced switching patterns (e.g., notches always positioned when Vref 1140 is positive or always positioned when Vref 1140 is negative) and from a balanced load resulting from controlling the controller with the example switching pattern 1110 illustrated in FIG. 11.

FIG. 12 is a flowchart of one example of a method 1200 for providing a signal to a load, according to an illustrative embodiment of the invention. It will be appreciated that any appropriate signal may be provided to a load such as, for example, a power signal that is utilized to power the load.

The method 1200 may begin at block 1210. At block 1210, a power converter, such as converter 1000, may be provided. It will be appreciated that any suitable converter may be supplied in accordance with the embodiments of the invention. In one embodiment, an input power signal is also applied to the power converter.

At block 1220, which follows block 1210, at least one gating control signal may be supplied to the power converter. The gating control signal has switching pattern with a waveform with an effective switching frequency anywhere between approximately 1 times the fundamental frequency of the switching pattern to approximately 2 times the fundamental frequency. For example, as is described above with reference to FIG. 3 and Table 2, the switching frequency may be approximately 1.5 times the fundamental frequency in one embodiment. Also as described above, the switching pattern includes at least two notches, separated so as to cause the switching frequency. The notches may be any width and may be adjusted to achieve the desired results. Further, multiple gating control signals may be supplied to the power converter, each of which may be phase shifted relative to each other.

Block 1230 optionally follows block 1220, in which the switching pattern of the one or more gating control signals may be adjusted. For example, the positioning of the notches, such as to alternate between occurring at a positive slope of Vref and a negative slope of Vref, as is further described with reference to FIG. 11. The switching patterns may be adjusted to improve one or more of the temperature balance within the power converter, the power loss or switching loss within the power converter or at the load, or the harmonic distortion of the output power signal. It is appreciated that in some embodiments the gating control signal may be adjusted prior to operation, during operation, after operation, or may not be adjusted at all.

Block 1240 follows optional block 1230, or block 1220 if block 1230 is not performed, in which at least one signal may be output from the converter based at least in part on the gating control signal. The at least one output signal may be supplied to a load such as, for example, a HSEM.

Many modifications and other embodiments of the exemplary descriptions set forth herein to which these descriptions pertain will come to mind having the benefit of the teachings presented in the foregoing descriptions and the associated drawings. Thus, it will be appreciated the invention may be embodied in many forms and should not be limited to the exemplary embodiments described above. Therefore, it is to be understood that the invention is not to be limited to the specific embodiments disclosed and that the modification and other embodiments are intended to be included within the scope of the appended claims. Although specific terms are employed herein, they are used in a generic and descriptive sense only and not for purposes of limitation.

That which is claimed:

1. A method for powering a load, comprising:
providing a power converter;
supplying at least one gating control signal comprising a switching pattern to the power converter, wherein the switching pattern comprises a waveform comprising an effective switching frequency greater than 1 times the fundamental frequency of the switching pattern and less than 2 times the fundamental frequency of the switching pattern; and
outputting at least one output power signal to the load responsive at least in part to the at least one gating control signal supplied.

2. The method of claim 1, wherein supplying at least one gating control signal comprises supplying at least one gating control signal comprising a switching pattern comprising at least two notches separated by an angle greater than approximately 360 degrees and less than approximately 720 degrees.

3. The method of claim 1, wherein supplying at least one gating control signal comprises supplying at least one dating control signal comprising an effective switching frequency of approximately 1.5 times the fundamental frequency of the switching pattern.

4. The method of claim 1, wherein supplying at least one gating control signal comprises supplying at least one gating control signal comprising a switching pattern comprising at least a first notch and a second notch, wherein the first notch is positioned to occur at a substantially positive slope of a reference voltage of the at least one gating control signal and the second notch is positioned to occur at a substantially negative slope of the reference voltage.

5. The method of claim 1, wherein supplying at least one gating control signal comprises supplying at least one gating control signal comprising a switching pattern comprising a plurality of notches, wherein the positions of the plurality of notches alternate between a substantially positive slope of a reference voltage of the at least one gating control signal and a substantially negative slope of the reference voltage.

6. The method of claim 1, wherein supplying at least one gating control signal comprises supplying a first gating control signal and a second gating control signal to the power converter, each gating control signal comprising a switching pattern comprising at least two notches, and wherein the second gating control signal is phase shifted relative to the first gating control signal.

7. The method of claim 1, wherein the power converter comprises electrical circuitry comprising a first leg and a second leg, and wherein supplying at least one gating control signal comprises supplying a first gating control signal to the first leg and supplying a second gating control signal to the second leg.

8. The method of claim 7, wherein the second gating control signal is phase shifted relative to the first gating control signal.

9. The method of claim 7, wherein the first leg comprises a first semiconductor and the second leg comprises a second semiconductor, and adjusting the position of the notches of each gating control signal to improve at least one of: (i) the temperature balance between the first semiconductor and the second semiconductor, (ii) the power loss in the first semiconductor and the second semiconductor, or (iii) the harmonic distortion of the output power signal.

10. The method of claim 1, further comprising adjusting the switching pattern of the at least one gating control signal to improve at least one of: (i) the temperature balance within the power converter, (ii) the power loss within the power converter, or (iii) the harmonic distortion of the output power signal.

11. The method of claim 1, wherein supplying at least one gating control signal comprises supplying at least one gating control signal comprising a switching pattern comprising at least two notches, and further comprising adjusting the separation between the at least two notches to improve at least one of: (i) the temperature balance within the power converter, (ii) the power loss within the power converter, or (iii) the harmonic distortion of the output power signal.

12. The method of claim 11, wherein the position of a first notch is adjusted to occur at a substantially positive slope of a reference voltage of the at least one gating control signal and the position of a second notch is adjusted to occur at a substantially negative slope of the reference voltage.

13. A system for providing power to a load, comprising:
a voltage source operable to supply a power signal;
a power converter; and
at least one gating controller operable to supply at least one gating control signal comprising a switching pattern to the power converter, wherein the switching pattern comprises a waveform comprising an effective switching frequency greater than 1 times the fundamental frequency of the switching pattern and less than 2 times the fundamental frequency of the switching pattern;
wherein the converter is operable to receive the power signal from the voltage source and output at least one output power signal to the load responsive at least in part to the at least one gating control signal supplied.

14. The system of claim 13, wherein the at least one gating controller is operable to supply a gating control signal comprising a switching pattern comprising at least two notches separated by an angle greater than approximately 360 degrees and less than approximately 720 degrees.

15. The system of claim 13, wherein the at least one gating controller is operable to supply a gating control signal comprising an effective switching frequency of approximately 1.5 times the fundamental frequency of the switching pattern.

16. The system of claim 13, wherein the at least one gating controller is operable to supply at least one gating control signal comprising a switching pattern comprising at least a first notch and a second notch, wherein the first notch is positioned to occur at a substantially positive slope of a reference voltage of the at least one gating control signal and the second notch is positioned to occur at a substantially negative slope of the reference voltage.

17. The system of claim 13, wherein the power converter comprises electrical circuitry comprising a first leg and a second leg, and wherein the at least one gating controller is operable to supply a first gating control signal to the first leg and supplying a second gating control signal to the second leg.

18. The system of claim 17, wherein the first leg comprises a first semiconductor and the second leg comprises a second semiconductor, and wherein the at least one gating controller is operable to adjust the position of the notches of each gating control signal to improve at least one of: (i) the temperature balance between the first semiconductor and the second semiconductor or (ii) the power loss in the first semiconductor and the second semiconductor.

19. The system of claim 13, wherein the at least one gating controller is operable to adjust the switching pattern of the at least one gating control signal to improve at least one of: (i) the temperature balance within the power converter, (ii) the power loss within the power converter, or (iii) the harmonic distortion of the output power signal.

20. A method for powering a load, comprising:
providing a three-phase wye-connected H-bridge power converter, wherein each phase of the H-bridge power converter comprises two legs;
supplying an input power signal to the H-bridge power converter;
supplying a different gating control signal comprising a switching pattern to each leg of each phase of the H-bridge power converters wherein each switching pattern comprises a waveform comprising at least a first notch positioned to occur at a substantially positive slope of a reference voltage of the respective gating control signal and a second notch positioned to occur at a substantially negative slope of the reference voltage, the waveform comprising an effective switching frequency greater than 1 times the fundamental frequency of the switching pattern and less than 2 times the fundamental frequency of the switching pattern, wherein the degrees of separation between each notch determines the effective switching frequency; and
outputting at least one output power signal to the load responsive at least in part to the gating control signals supplied.

* * * * *